US012642171B2

(12) United States Patent
Feng et al.

(10) Patent No.: US 12,642,171 B2
(45) Date of Patent: Jun. 2, 2026

(54) HAND-PUSHED POWER TOOL AND HANDLE DEVICE THEREOF

(71) Applicant: Nanjing Chervon Industry Co., Ltd., Nanjing (CN)

(72) Inventors: Jifeng Feng, Nanjing (CN); Chao Xian, Nanjing (CN); Xiancheng Fan, Nanjing (CN); Qi Zhang, Nanjing (CN); Toshinari Yamaoka, Nanjing (CN); Zhe Chen, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 574 days.

(21) Appl. No.: 18/170,004

(22) Filed: Feb. 16, 2023

(65) Prior Publication Data

US 2023/0189704 A1 Jun. 22, 2023

Related U.S. Application Data

(63) Continuation of application No. PCT/CN2022/101474, filed on Jun. 27, 2022.

(30) Foreign Application Priority Data

Jun. 29, 2021 (CN) .......................... 202110729715.0
Jun. 29, 2021 (CN) .......................... 202121463161.6

(51) Int. Cl.
*A01D 34/82* (2006.01)
*A01D 34/00* (2006.01)
(Continued)

(52) U.S. Cl.
CPC ........... *A01D 34/78* (2013.01); *A01D 34/006* (2013.01); *A01D 34/68* (2013.01); *A01D 34/824* (2013.01);
(Continued)

(58) Field of Classification Search
CPC ............ A01D 69/10; A01D 2034/6843; A01D 2101/00; A01D 34/824; A01D 34/67;
(Continued)

(56) References Cited

U.S. PATENT DOCUMENTS 1,387,578 A 8/1921 Yost
1,850,326 A 3/1932 Kelly
(Continued)

FOREIGN PATENT DOCUMENTS

CA 2397429 A1 2/2004
CH 391387 A 4/1965
(Continued)

OTHER PUBLICATIONS

Final Office Action, U.S. Appl. No. 16/722,589, Jun. 21, 2021, 11 pp.
(Continued)

*Primary Examiner* — Adam J Behrens
(74) *Attorney, Agent, or Firm* — Greenberg Traurig, LLP

(57) ABSTRACT

A hand-pushed power tool includes a tool body including a working assembly, a control unit for controlling running of the working assembly, and a handle device. The handle device includes an operation member and a connecting rod assembly including a first connecting rod connected to the tool body. The first connecting rod includes a first lower rod portion and a first upper rod portion. The first upper rod portion is slidable relative to the first lower rod portion to a retracted position and an expanded position. The handle device further includes a detection device including a first detection element for detecting a telescopic state of the handle device, and a control device mounted to the operation member and electrically or communicatively connected to the first detection element. The control device is configured
(Continued)

to control the control unit according to detection information from the first detection element.

16 Claims, 22 Drawing Sheets

(51) Int. Cl.
  *A01D 34/68* (2006.01)
  *A01D 34/78* (2006.01)
  *A01D 101/00* (2006.01)
(52) U.S. Cl.
  CPC .. *A01D 2034/6843* (2013.01); *A01D 2101/00* (2013.01)
(58) Field of Classification Search
  CPC .. A01D 34/6806; A01D 34/828; A01D 34/02; A01D 34/68; A01D 34/78
  See application file for complete search history.

(56) References Cited

U.S. PATENT DOCUMENTS

| | | | |
|---|---|---|---|
| 1,866,380 A | 7/1932 | Wagner | |
| 1,896,442 A | 2/1933 | Farmer | |
| 1,899,564 A | 2/1933 | Frey | |
| 2,067,916 A | 1/1937 | Haffner et al. | |
| 2,332,892 A | 10/1943 | Clemson | |
| 2,347,991 A | 5/1944 | Cummings | |
| 2,484,795 A | 10/1949 | Schofield | |
| D158,847 S | 6/1950 | Flanigan | |
| 2,513,685 A | 7/1950 | Smith et al. | |
| 2,515,573 A | 7/1950 | Soenksen | |
| 2,658,322 A | 11/1953 | Sullivan | |
| 2,672,002 A | 3/1954 | Nelson | |
| 2,688,834 A | 9/1954 | Kaeser | |
| 2,702,448 A | 2/1955 | Smith | |
| 2,715,808 A | 8/1955 | Heineke | |
| 2,724,598 A | 11/1955 | Knarzer | |
| 2,727,753 A | 12/1955 | Johnson et al. | |
| 2,757,013 A | 7/1956 | Brier | |
| 2,763,492 A | 9/1956 | Phelps | |
| 2,786,694 A | 3/1957 | Gray | |
| 2,791,079 A | 5/1957 | Funk | |
| 2,791,437 A | 5/1957 | Knarzer | |
| 2,809,490 A | 10/1957 | Oeters | |
| 2,817,548 A | 12/1957 | Uthemann | |
| 2,821,258 A | 1/1958 | Benson et al. | |
| 2,829,483 A | 4/1958 | Oeters | |
| 2,849,249 A | 8/1958 | Fridolph | |
| 2,867,960 A | 1/1959 | Stiles | |
| 2,965,386 A | 12/1960 | Buske | |
| 2,966,365 A | 12/1960 | Kortum | |
| 3,004,375 A | 10/1961 | Seyffer | |
| 3,029,887 A | 4/1962 | Schantz | |
| 3,035,719 A | 5/1962 | McClean | |
| 3,038,737 A | 6/1962 | Lill | |
| 3,089,301 A | 5/1963 | Przekop | |
| 3,119,637 A | 1/1964 | Eaves | |
| 3,130,444 A | 4/1964 | Stollsteimer | |
| 3,142,950 A | 8/1964 | West | |
| 3,144,258 A | 8/1964 | Ottosen et al. | |
| 3,174,471 A | 3/1965 | Weglage et al. | |
| 3,203,707 A | 8/1965 | Anderson | |
| 3,209,887 A | 10/1965 | Feldstein | |
| 3,230,695 A | 1/1966 | West | |
| 3,243,196 A | 3/1966 | Amis | |
| 3,246,909 A | 4/1966 | Siwek | |
| 3,253,391 A | 5/1966 | Meldahl | |
| 3,357,716 A | 12/1967 | Musichuk | |
| 3,423,103 A | 1/1969 | Maltarp | |
| 3,462,924 A | 8/1969 | Erickson et al. | |
| 3,465,505 A | 9/1969 | Krinke | |
| 3,481,123 A | 12/1969 | Lessig, III | |
| 3,485,017 A | 12/1969 | Beares et al. | |
| 3,496,706 A | 2/1970 | Mattson | |
| 3,527,469 A | 9/1970 | Gobin | |
| 3,534,432 A * | 10/1970 | Davies | B62D 51/001 |
| | | | 280/655.1 |
| 3,603,065 A | 9/1971 | Weber | |
| 3,604,187 A | 9/1971 | Weber | |
| 3,642,051 A | 2/1972 | Goldner | |
| 3,649,997 A | 3/1972 | Thorud | |
| 3,659,170 A | 4/1972 | Burkett | |
| 3,696,593 A | 10/1972 | Thorud | |
| 3,702,016 A | 11/1972 | Keesee | |
| 3,747,430 A | 7/1973 | Miner | |
| 3,750,378 A | 8/1973 | Thorud | |
| 3,756,336 A | 9/1973 | Mattingly | |
| 3,764,156 A | 10/1973 | Nepper et al. | |
| 3,809,837 A | 5/1974 | Yoshioka | |
| 3,816,873 A | 6/1974 | Thorud et al. | |
| 3,817,547 A | 6/1974 | Erickson | |
| 3,823,291 A | 7/1974 | Milcoy | |
| 3,855,763 A | 12/1974 | Seifert | |
| 3,942,604 A | 3/1976 | Black, III | |
| 3,958,017 A | 5/1976 | Morse et al. | |
| 3,982,082 A | 9/1976 | Thorud et al. | |
| 3,998,476 A | 12/1976 | Kazmark, Sr. | |
| 4,003,190 A | 1/1977 | Braun et al. | |
| 4,015,406 A | 4/1977 | Witt et al. | |
| 4,037,389 A | 7/1977 | Harkness | |
| 4,041,679 A | 8/1977 | Seifert | |
| 4,043,102 A | 8/1977 | Uhlinger | |
| 4,044,532 A | 8/1977 | Lessig, III | |
| 4,054,394 A | 10/1977 | Neuman | |
| 4,071,922 A | 2/1978 | Davies, III et al. | |
| 4,108,456 A | 8/1978 | Woelffer et al. | |
| 4,110,869 A | 9/1978 | Hastings | |
| 4,161,639 A | 7/1979 | Nofel | |
| 4,167,221 A | 9/1979 | Edmonson et al. | |
| 4,181,333 A | 1/1980 | Stelma | |
| 4,212,363 A | 7/1980 | Letner et al. | |
| 4,216,363 A | 8/1980 | Nofel | |
| 4,221,106 A | 9/1980 | Owens | |
| 4,221,108 A | 9/1980 | Owens | |
| 4,245,456 A | 1/1981 | Zipfel | |
| 4,281,732 A | 8/1981 | Hoch | |
| 4,316,355 A | 2/1982 | Hoff | |
| 4,326,370 A | 4/1982 | Thorud | |
| 4,327,541 A | 5/1982 | Emory | |
| 4,362,228 A | 12/1982 | Plamper et al. | |
| 4,363,206 A | 12/1982 | Schmitt | |
| 4,392,538 A | 7/1983 | Goertzen | |
| 4,394,893 A | 7/1983 | Kronich | |
| 4,413,466 A | 11/1983 | Beugelsdyk et al. | |
| 4,413,486 A | 11/1983 | Beugelsdyk et al. | |
| 4,426,563 A | 1/1984 | Grogan | |
| 4,428,180 A | 1/1984 | Carlson | |
| 4,432,191 A | 2/1984 | Schmitt | |
| 4,435,105 A | 3/1984 | Rampley | |
| 4,476,643 A | 10/1984 | Hilchey et al. | |
| 4,492,170 A | 1/1985 | Solomon | |
| 4,503,958 A | 3/1985 | Nishio | |
| 4,531,347 A | 7/1985 | Schutz | |
| 4,561,239 A | 12/1985 | Cook | |
| 4,573,307 A | 3/1986 | Wick | |
| 4,596,484 A | 6/1986 | Nakatani | |
| 4,599,912 A | 7/1986 | Barnard et al. | |
| 4,603,478 A | 8/1986 | Anderson | |
| 4,659,664 A | 4/1987 | Wollenhaupt | |
| 4,659,884 A | 4/1987 | Wollenhaupt | |
| 4,738,084 A | 4/1988 | Ogano et al. | |
| 4,753,062 A | 6/1988 | Roelle | |
| 4,757,885 A | 7/1988 | Kronich | |
| 4,761,092 A | 8/1988 | Nakatani | |
| 4,833,935 A | 5/1989 | Roelle | |
| 4,850,182 A | 7/1989 | Barnard et al. | |
| 4,870,811 A | 10/1989 | Steele | |
| 4,882,897 A | 11/1989 | Oshima et al. | |
| 4,899,446 A | 2/1990 | Akiba | |
| 4,932,622 A | 6/1990 | Hayakawa | |
| 4,936,160 A | 6/1990 | Barnard et al. | |
| 4,981,011 A | 1/1991 | Olejak | |

(56)  References Cited

U.S. PATENT DOCUMENTS

| | | | |
|---|---|---|---|
| 4,987,729 A | 1/1991 | Paytas | |
| 5,020,308 A | 6/1991 | Braun et al. | |
| 5,088,273 A | 2/1992 | Braun et al. | |
| 5,138,824 A | 8/1992 | Oshima et al. | |
| 5,146,735 A | 9/1992 | McDonner | |
| 5,155,985 A | 10/1992 | Oshima et al. | |
| 5,163,275 A | 11/1992 | Hare et al. | |
| 5,195,307 A | 3/1993 | Thorud | |
| 5,203,147 A | 4/1993 | Long | |
| 5,209,051 A | 5/1993 | Langdon | |
| 5,261,215 A | 11/1993 | Hartz et al. | |
| 5,269,125 A | 12/1993 | Langley, Sr. et al. | |
| 5,299,414 A | 4/1994 | Long | |
| 5,301,494 A | 4/1994 | Peot | |
| 5,307,612 A | 5/1994 | Tomiyama | |
| 5,343,678 A | 9/1994 | Stuart | |
| 5,511,367 A | 4/1996 | Powers | |
| 5,517,809 A | 5/1996 | Rich | |
| 5,558,210 A | 9/1996 | Jonischus | |
| 5,591,109 A | 1/1997 | Strnad | |
| 5,606,851 A | 3/1997 | Bruener et al. | |
| 5,636,504 A | 6/1997 | Kaley et al. | |
| 5,653,096 A | 8/1997 | Edwards | |
| 5,692,366 A | 12/1997 | Hardesty | |
| 5,692,856 A | 12/1997 | Newman, Jr. et al. | |
| 5,746,074 A | 5/1998 | Collins | |
| 5,772,162 A | 6/1998 | Lin | |
| 5,784,868 A | 7/1998 | Wadzinski et al. | |
| 5,791,805 A | 8/1998 | Lynch et al. | |
| 5,806,374 A | 9/1998 | Mizutani et al. | |
| 5,842,329 A | 12/1998 | Carter | |
| 5,894,715 A | 4/1999 | Braun et al. | |
| 6,006,434 A | 12/1999 | Templeton et al. | |
| 6,078,015 A | 6/2000 | Martinez | |
| 6,082,083 A * | 7/2000 | Stalpes | A01D 34/6806 56/11.1 |
| 6,095,294 A | 8/2000 | McGourthy, Sr. et al. | |
| 6,101,678 A | 8/2000 | Malloy et al. | |
| 6,124,791 A | 9/2000 | Wolf | |
| 6,142,699 A | 11/2000 | Pao | |
| 6,158,089 A | 12/2000 | Monahan et al. | |
| 6,220,005 B1 | 4/2001 | Plamper et al. | |
| 6,293,349 B1 | 9/2001 | Marshall | |
| 6,317,930 B1 | 11/2001 | Hung | |
| 6,404,078 B1 | 6/2002 | Thomas et al. | |
| 6,449,935 B1 | 9/2002 | Nicolay et al. | |
| 6,581,246 B1 | 6/2003 | Polette | |
| 6,644,002 B2 | 11/2003 | Trefz | |
| 6,658,829 B2 | 12/2003 | Kobayashi et al. | |
| 6,698,173 B2 | 3/2004 | Joseph | |
| 6,708,473 B2 | 3/2004 | Nicolay et al. | |
| 6,737,598 B1 | 5/2004 | Allen | |
| 6,751,936 B2 | 6/2004 | Kucera et al. | |
| 6,796,392 B2 | 9/2004 | Kobayashi et al. | |
| 6,902,024 B2 | 6/2005 | Miller et al. | |
| 6,945,133 B2 | 9/2005 | Rush | |
| 6,996,960 B1 | 2/2006 | Flemm | |
| 6,996,963 B2 | 2/2006 | Peter et al. | |
| 7,131,499 B2 | 11/2006 | Breneman et al. | |
| 7,178,322 B2 | 2/2007 | Osborne | |
| 7,179,200 B1 | 2/2007 | Wu | |
| 7,231,755 B2 * | 6/2007 | Clarke | A01D 34/824 56/14.7 |
| 7,237,620 B2 | 7/2007 | Abenroth et al. | |
| 7,240,756 B2 | 7/2007 | Derby | |
| 7,263,817 B1 | 9/2007 | Smith | |
| 7,263,818 B2 | 9/2007 | Osborne | |
| 7,275,322 B2 | 10/2007 | Stones | |
| 7,293,397 B2 | 11/2007 | Osborne | |
| 7,314,096 B2 | 1/2008 | Shaffer et al. | |
| 7,367,409 B2 | 5/2008 | Stones | |
| 7,401,660 B2 | 7/2008 | Stones | |
| 7,496,990 B2 | 3/2009 | Qiao | |
| 7,523,600 B2 | 4/2009 | Sasaoka | |
| 7,543,430 B2 | 6/2009 | Kaskawitz et al. | |
| 7,591,126 B2 | 9/2009 | Cox | |
| 7,624,998 B2 | 12/2009 | Barlow et al. | |
| 7,707,812 B2 | 5/2010 | Cheung | |
| 7,712,292 B2 | 5/2010 | Stover et al. | |
| 7,762,049 B2 | 7/2010 | Eaton et al. | |
| 8,098,036 B2 | 1/2012 | Matsunaga et al. | |
| 8,132,289 B2 | 3/2012 | Hahn | |
| 8,193,464 B2 | 6/2012 | Ahn | |
| 8,274,004 B2 | 9/2012 | Selzer | |
| 8,316,510 B2 | 11/2012 | Anraku | |
| 8,359,821 B2 | 1/2013 | Park | |
| 8,448,293 B2 | 5/2013 | Sepke | |
| 8,635,744 B2 | 1/2014 | Junk et al. | |
| 8,713,761 B2 | 5/2014 | Grewe et al. | |
| 8,813,733 B2 | 8/2014 | Tamura et al. | |
| 8,839,692 B2 | 9/2014 | Yanai et al. | |
| 8,925,293 B2 | 1/2015 | Mikula et al. | |
| 9,038,356 B2 | 5/2015 | Shao et al. | |
| 9,060,463 B2 * | 6/2015 | Yamaoka | H01H 3/16 |
| 9,109,616 B1 | 8/2015 | Ballentine | |
| 9,179,597 B1 | 11/2015 | Kaspar | |
| 9,218,924 B2 | 12/2015 | Coussins et al. | |
| 9,232,962 B2 | 1/2016 | Bjorn et al. | |
| 9,433,147 B2 | 9/2016 | Schmalz | |
| 9,462,747 B2 | 10/2016 | Schmalz | |
| 9,491,907 B2 | 11/2016 | Edholm et al. | |
| 9,496,809 B2 | 11/2016 | Nakano et al. | |
| 9,596,806 B2 | 3/2017 | Yamaoka et al. | |
| 9,648,805 B2 | 5/2017 | Nie et al. | |
| 9,651,138 B2 | 5/2017 | Helin et al. | |
| 9,826,686 B2 | 11/2017 | Yamaoka et al. | |
| 9,847,186 B2 | 12/2017 | Wadzinski | |
| 9,855,490 B2 | 1/2018 | McGuffie | |
| 9,888,627 B2 | 2/2018 | Yamaoka et al. | |
| 9,955,627 B2 * | 5/2018 | Nakano | A01G 3/062 |
| 9,986,686 B2 | 6/2018 | Yamaoka et al. | |
| 10,039,229 B2 | 8/2018 | Wadzinski et al. | |
| 10,070,588 B2 | 9/2018 | Yamaoka et al. | |
| 10,111,381 B2 | 10/2018 | Shaffer et al. | |
| 10,123,478 B2 | 11/2018 | Shaffer et al. | |
| 10,433,478 B2 | 10/2019 | Smith et al. | |
| 10,477,772 B2 | 11/2019 | Yamaoka et al. | |
| 10,485,169 B2 | 11/2019 | Yamaoka et al. | |
| 10,485,176 B2 * | 11/2019 | Yamaoka | A01D 34/824 |
| 10,492,365 B2 | 12/2019 | Yamaoka et al. | |
| 10,524,420 B2 | 1/2020 | Yamaoka et al. | |
| 11,246,262 B2 | 2/2022 | Yamaoka et al. | |
| 11,252,867 B2 | 2/2022 | Yamaoka et al. | |
| 11,606,900 B2 * | 3/2023 | Yamaoka | A01D 34/6806 |
| 11,622,502 B2 | 4/2023 | Wei | |
| 11,638,397 B2 * | 5/2023 | Burns, III | A01D 34/68 16/437 |
| 2003/0006074 A1 | 1/2003 | Ishikawa et al. | |
| 2003/0093983 A1 | 5/2003 | Savard et al. | |
| 2004/0194982 A1 | 10/2004 | Fukzumi et al. | |
| 2005/0144919 A1 | 7/2005 | Osborne | |
| 2006/0005673 A1 | 1/2006 | Long et al. | |
| 2006/0053762 A1 | 3/2006 | Stover et al. | |
| 2006/0053763 A1 | 3/2006 | Stover et al. | |
| 2006/0075641 A1 | 4/2006 | Nottingham et al. | |
| 2006/0075732 A1 | 4/2006 | Nottingham et al. | |
| 2006/0096135 A1 | 5/2006 | Schaffer et al. | |
| 2006/0127167 A1 | 6/2006 | Hsieh | |
| 2006/0166792 A1 | 7/2006 | Kuo | |
| 2007/0101690 A1 | 5/2007 | Stover et al. | |
| 2007/0256401 A1 | 11/2007 | Hibi | |
| 2007/0256402 A1 | 11/2007 | McCane et al. | |
| 2008/0078156 A1 | 4/2008 | Qiao | |
| 2008/0256919 A1 | 10/2008 | Schreiner | |
| 2009/0025351 A1 | 1/2009 | Faeldan | |
| 2009/0038281 A1 | 2/2009 | Kaskawitz et al. | |
| 2009/0107282 A1 | 4/2009 | Mangham | |
| 2009/0217636 A1 | 9/2009 | Loxterkamp | |
| 2009/0293655 A1 | 12/2009 | Tseng et al. | |
| 2010/0064650 A1 | 3/2010 | Mccane | |
| 2010/0162674 A1 | 7/2010 | Eaton | |
| 2010/0199949 A1 | 8/2010 | Tamura et al. | |
| 2010/0229402 A1 | 9/2010 | Trethowan | |
| 2011/0088362 A1 | 4/2011 | Rosa et al. | |

(56) References Cited

U.S. PATENT DOCUMENTS

| 2011/0126502 A1 | 6/2011 | Pitman et al. |
|---|---|---|
| 2011/0219565 A1 | 9/2011 | Sepke |
| 2011/0302893 A1 | 12/2011 | Park |
| 2011/0302895 A1 | 12/2011 | Park |
| 2012/0055277 A1 | 3/2012 | Wu |
| 2012/0305041 A1 | 12/2012 | Lah et al. |
| 2012/0317821 A1 | 12/2012 | Tsuchiya |
| 2012/0317948 A1 | 12/2012 | Abe et al. |
| 2012/0317949 A1 | 12/2012 | Abe et al. |
| 2012/0324682 A1 | 12/2012 | Ballentine et al. |
| 2013/0111866 A1 | 5/2013 | Schmalz |
| 2013/0212996 A1* | 8/2013 | Shao .................. A01D 34/824 |
| | | 56/16.7 |
| 2013/0305675 A1 | 11/2013 | Pare |
| 2014/0102063 A1* | 4/2014 | Yamaoka ............... H01H 15/10 |
| | | 200/539 |
| 2014/0102064 A1 | 4/2014 | Yamaoka et al. |
| 2014/0167398 A1 | 6/2014 | Burns et al. |
| 2014/0190141 A1 | 7/2014 | Edholm et al. |
| 2014/0196425 A1 | 7/2014 | Lewis |
| 2014/0331809 A1 | 11/2014 | Mikula |
| 2014/0374557 A1 | 12/2014 | Yu |
| 2016/0324065 A1 | 11/2016 | Smith et al. |
| 2016/0356660 A1 | 12/2016 | Yamaoka et al. |
| 2017/0049047 A1* | 2/2017 | Yamaoka ............... A01D 34/67 |
| 2017/0049049 A1* | 2/2017 | Yamaoka ............. A01D 34/828 |
| 2017/0086370 A1* | 3/2017 | Yamaoka ............. A01D 34/828 |
| 2017/0086375 A1 | 3/2017 | Yamaoka et al. |
| 2017/0367258 A1 | 12/2017 | Shaffer et al. |
| 2018/0228089 A1 | 8/2018 | Yamaoka et al. |
| 2019/0269073 A1 | 9/2019 | Yamaoka et al. |
| 2020/0000030 A1* | 1/2020 | Wei ........................ A01D 75/18 |
| 2020/0060091 A1* | 2/2020 | Yamaoka ........... A01D 34/6806 |
| 2020/0107497 A1 | 4/2020 | Ferrell et al. |
| 2020/0214209 A1 | 7/2020 | Yamaoka et al. |
| 2021/0243948 A1* | 8/2021 | Burns, III .............. A01D 34/68 |
| 2022/0124977 A1 | 4/2022 | Yamaoka et al. |
| 2022/0124982 A1* | 4/2022 | Yamaoka ............... A01D 69/10 |
| 2022/0279714 A1 | 9/2022 | Ro |
| 2022/0330480 A1 | 10/2022 | Yamaoka et al. |
| 2022/0346312 A1 | 11/2022 | Takahashi |
| 2022/0408640 A1 | 12/2022 | Hiller |
| 2023/0034760 A1 | 2/2023 | Fu |
| 2023/0073356 A1* | 3/2023 | Yamaoka ............... A01D 69/10 |
| 2024/0090373 A1 | 3/2024 | Hou |

FOREIGN PATENT DOCUMENTS

| CN | 1299582 A | 6/2001 |
|---|---|---|
| CN | 200953749 Y | 9/2006 |
| CN | 200993141 Y | 9/2006 |
| CN | 101006763 A | 8/2007 |
| CN | 201044581 Y | 4/2008 |
| CN | 201146132 Y | 11/2008 |
| CN | 101516178 A | 8/2009 |
| CN | 201345826 Y | 11/2009 |
| CN | 201360427 Y | 12/2009 |
| CN | 201455951 U | 5/2010 |
| CN | 101822148 A | 9/2010 |
| CN | 101897261 A | 12/2010 |
| CN | 201821663 | 5/2011 |
| CN | 201821663 U | 5/2011 |
| CN | 102217455 A | 10/2011 |
| CN | 102232333 A | 11/2011 |
| CN | 202019551 U * | 11/2011 |
| CN | 202026623 U | 11/2011 |
| CN | 102523817 A | 7/2012 |
| CN | 102683052 A | 9/2012 |
| CN | 202455826 U | 10/2012 |
| CN | 102845186 A | 1/2013 |
| CN | 202873363 U | 4/2013 |
| CN | 103283374 A | 9/2013 |
| CN | 203872585 U | 10/2014 |
| CN | 204119802 U | 1/2015 |
| CN | 104823599 A | 8/2015 |
| CN | 204796180 U | 11/2015 |
| CN | 104541737 A | 11/2016 |
| CN | 104114333 B | 3/2017 |
| CN | 106625459 A | 5/2017 |
| CN | 107046921 A | 8/2017 |
| CN | 107182426 A | 9/2017 |
| CN | 206596381 U | 10/2017 |
| CN | 207443478 U | 10/2017 |
| CN | 206629456 U | 11/2017 |
| CN | 105815028 A | 12/2017 |
| CN | 107455067 A | 12/2017 |
| CN | 206790995 U | 12/2017 |
| CN | 207120188 U | 3/2018 |
| CN | 108684299 A | 10/2018 |
| CN | 207940017 U | 10/2018 |
| CN | 108718664 A | 11/2018 |
| CN | 108834543 A | 11/2018 |
| CN | 109392418 A | 3/2019 |
| CN | 208798363 U | 4/2019 |
| CN | 110103110 A | 8/2019 |
| CN | 110636754 A | 12/2019 |
| CN | 106171253 B | 6/2020 |
| CN | 111406498 A | 7/2020 |
| CN | 111492805 A | 8/2020 |
| CN | 107920467 A | 4/2021 |
| DE | 2632526 A1 | 1/1978 |
| DE | 3827926 A1 | 2/1990 |
| DE | 3926098 A1 | 8/1995 |
| DE | 102004020985 A1 | 11/2005 |
| DE | 202004019453 U1 | 4/2006 |
| DE | 202006015259 U1 | 2/2007 |
| DE | 1020100443021 A1 | 3/2012 |
| DE | 102017205320 A1 | 10/2018 |
| EP | 0047416 A1 | 3/1982 |
| EP | 0185513 A1 | 6/1986 |
| EP | 0822346 A1 | 2/1998 |
| EP | 0903074 A1 | 3/1999 |
| EP | 0981945 A2 | 3/2000 |
| EP | 1106046 A1 | 6/2001 |
| EP | 1183931 | 3/2002 |
| EP | 1431998 A2 | 6/2004 |
| EP | 1543711 A2 | 6/2005 |
| EP | 1627560 A1 | 2/2006 |
| EP | 1741937 A1 | 1/2007 |
| EP | 1742008 A1 | 1/2007 |
| EP | 1792533 | 6/2007 |
| EP | 1949782 A1 | 7/2008 |
| EP | 1695608 B1 | 12/2009 |
| EP | 2425700 A2 | 3/2012 |
| EP | 2465337 A1 | 6/2012 |
| EP | 2491777 A1 | 8/2012 |
| EP | 2556739 A1 | 2/2013 |
| EP | 2622953 A1 | 8/2013 |
| EP | 2689651 A1 | 1/2014 |
| EP | 2774470 A1 | 9/2014 |
| EP | 2784335 A1 | 10/2014 |
| EP | 3381259 | 10/2018 |
| EP | 3381259 A1 * | 10/2018 ........... A01D 43/063 |
| FR | 2348644 A1 | 11/1977 |
| FR | 2489651 A3 | 9/1982 |
| FR | 2768300 A1 | 3/1999 |
| FR | 3768300 A1 | 3/1999 |
| FR | 2768300 B1 | 11/1999 |
| FR | 2780375 A1 | 12/1999 |
| GB | 1064828 A | 4/1967 |
| GB | 2066033 A | 7/1981 |
| GB | 2139329 A | 9/1986 |
| GB | 2316458 A | 2/1998 |
| GB | 2386813 A | 10/2003 |
| GB | 2413254 A | 10/2005 |
| GB | 2449715 A | 12/2008 |
| JP | S63158120 U | 10/1988 |
| JP | H01162916 A | 6/1989 |
| JP | H01235516 A | 9/1989 |
| JP | H01312923 A | 12/1989 |
| JP | 02003226 U | 1/1990 |
| JP | H0530835 A | 2/1993 |
| JP | H0584102 U | 11/1993 |

(56) References Cited

FOREIGN PATENT DOCUMENTS

| | | | |
|---|---|---|---|
| JP | H05284834 | A | 11/1993 |
| JP | H06153650 | A2 | 6/1994 |
| JP | H06153651 | A | 6/1994 |
| JP | 11346530 | A | 12/1999 |
| JP | 2003125627 | A | 5/2003 |
| JP | 2003130017 | A | 5/2003 |
| JP | 4485316 | A | 4/2006 |
| JP | 2007116958 | A | 5/2007 |
| JP | 2008283926 | A | 11/2008 |
| JP | 2009034000 | A | 2/2009 |
| JP | 2009268437 | A | 11/2009 |
| JP | 2010274668 | A | 12/2010 |
| JP | 2011072211 | A | 4/2011 |
| JP | 20110272211 | A | 4/2011 |
| JP | 2013063052 | A | 4/2013 |
| JP | 2013066401 | A | 4/2013 |
| JP | 2013146241 | A | 8/2013 |
| JP | 2013153753 | A | 8/2013 |
| JP | 2013165676 | A | 8/2013 |
| JP | 2013247888 | A | * 12/2013 |
| WO | 2004086850 | A1 | 10/2004 |
| WO | 2007051553 | A1 | 5/2007 |
| WO | 2008026550 | A1 | 3/2008 |
| WO | 2011026416 | A1 | 3/2011 |
| WO | 2012115543 | A1 | 8/2012 |
| WO | 20120115543 | A1 | 8/2012 |
| WO | 2013015171 | A1 | 1/2013 |
| WO | 2013122266 | A2 | 8/2013 |
| WO | 20130122266 | A2 | 8/2013 |
| WO | 2018086034 | A1 | 5/2018 |
| WO | 2020230212 | A1 | 11/2020 |
| WO | 2021203646 | A1 | 10/2021 |

OTHER PUBLICATIONS

Final Office Action, U.S. Appl. No. 15/250,516, Jan. 29, 2018, 7 pp.
Final Office Action, U.S. Appl. No. 14/048,158, Apr. 21, 2016, 8 pp.
Non-Final Office Action, U.S. Appl. No. 16/670,821, Aug. 5, 2022, 8 pp.
Non-Final Office Action, U.S. Appl. No. 17/209,722, Jun. 25, 2021, 12 pp.
Non-final Office Action, U.S. Appl. No. 14/511,490, Jan. 22, 2016, 6 pp.
Non-final Office Action, U.S. Appl. No. 16/722,589, Mar. 3, 2020, 6 pp.
Non-final Office Action, U.S. Appl. No. 16/722,589, Sep. 14, 2020, 9 pp.
Non-final Office Action, U.S. Appl. No. 14/048,158, Oct. 7, 2016, 13 pp.
Non-final Office Action, U.S. Appl. No. 14/058,158, Oct. 2, 2015, 9 pp.
One World's Initial Invalidity Contentions Exhibit I-1—420 Chart, Case No. 19-1923-LPS, 19 pp.
One World's Initial Invalidity Contentions Exhibits G-1-G-3 772 Chart, Case No. 19-1923-LPS, 69 pp.
One World's Initial Invalidity Contentions Exhibits H-1-H-2 176 Chart, Case No. 19-1923-LPS, 78 pp.
Rule 36 Judgment in IPRs 2020-0884, 2020-00886, 2020-00887, 2020-00888, Apr. 10, 2023, 3 pp.
International Search and Written Opinion of application No. PCT/CN22/101474, dated Sep. 7, 2022, 7 pp.
Non-final Office Action from U.S. Appl. No. 17/570,032, dated Mar. 17, 2025, 13 pp.
Non-final Office Action from U.S. Appl. No. 19/068,586, dated Apr. 25, 2025, 9 pp.
"22in Recycler Lawn Mower." Toro. 2008. https://www.toro.com/getpub/43137 (Accessed Apr. 24, 2023.).
"34 A easyMove." Gardena. 2005. https://www.gardena.com/tdrdownload/pub000026260/doc000052340 (Accessed Apr. 27, 2023.).

"Battery-Powered Mower." Neuton. 2010. https://dam.generac.com/ImConvServlet/imconv/4486fd95f2c1b65d17be9d3697d6d93045070a4c/original (Accessed Apr. 27, 2023.), 28 pp.
"Viking MA 339 and MA 339 C premium battery-powered lawn mowers." Stihl. 2010. https://www.stihl-tirol.com/new-viking-ma-339-and-ma-339-c-premium-battery-powered-lawn-mowers.aspx (Accessed Apr. 27, 2023.).
ANSI B.71.1-2012, American National Standard for Consumer Turf Care Equipment—Pedestrian-Controlled Mowers and Ride-On Mowers—Safety Specifications, 121 pp.
One World Technologies, Inc's Final Invalidity Contentions, C.A. No. 19-1293-LPS, 52 pp.
Ryobi Model No. BMM2400 Operator's Manual, 28 pp.
Ryobi Singer Corded and Cordless Mowers Service Manual, 52 pp.
Non-final Office Action from U.S. Appl. No. 17/854,815, dated Jun. 24, 2025, 11pp.
Non-final Office Action from U.S. Appl. No. 17/941,652, dated Jun. 20, 2025, 11pp.
Final Office Action from U.S. Appl. No. 16/824,858, dated Jan. 24, 2024, 14 pp.
Canadian Intellectual Property Office, Office Action and Examination Search Report issued on CA Appl. No. 2,829,898, dated Jan. 27, 2015, 4 pgs.
United States Patent and Trademark Office, Office Action issued on U.S. Appl. No. 14/048,158, Notification Date May 1, 2017, 29 pages.
United States Patent and Trademark Office, Non-Final Office Action issued in U.S. Appl. No. 15/373,840, Notification Date of Apr. 19, 2019, 14 pgs.
United States Patent and Trademark Office, Non-Final Office Action issued in U.S. Appl. No. 15/373,798, Notification Date of Apr. 29, 2019, 21 pgs.
United States Patent and Trademark Office, Non-Final Office Action issued on U.S. Appl. No. 15/910,282, Notification Date of Jul. 30, 2019, 6 pgs.
United States Patent and Trademark Office, Non-Final Office Action issued on U.S. Appl. No. 16/406,337, Notification Date of Jul. 30, 2019, 8 pgs.
Decision dated Nov. 6, 2020 for IPR2020-00883, 24 pages.
Decision dated Nov. 6, 2020 for IPR2020-00884, 62 pages.
Decision dated Nov. 6, 2020 for IPR2020-00885, 43 pages.
Decision dated Nov. 6, 2020 for IPR2020-00886, 62 pages.
Decision dated Nov. 6, 2020 for IPR2020-00887, 55 pages.
Decision dated Nov. 6, 2020 for IPR2020-00888, 74 pages.
Decision dated Dec. 7, 2020 for PGR2020-00059, 48 pages.
Decision dated Dec. 7, 2020 for PGR2020-00060, 57 pages.
Decision dated Dec. 7, 2020 for PGR2020-00061, 19 pages.
Case IPR2020-00883—U.S. Pat. No. 9,060,463—Petition for Inter Partes Review filed May 1, 2020.
Case IPR2020-00884—U.S. Pat. No. 9,596,806—Petition for Inter Partes Review filed May 1, 2020.
Case IPR2020-00885—U.S. Pat. No. 9,648,805—Petition for Inter Partes Review filed May 1, 2020.
Case IPR2020-00886—U.S. Pat. No. 9,826,686—Petition for Inter Partes Review filed May 1, 2020.
Case IPR2020-00887—U.S. Pat. No. 9,986,686—Petition for Inter Partes Review filed May 1, 2020.
Case IPR2020-00888—U.S. Pat. No. 10,070,588—Petition for Inter Partes Review filed May 1, 2020.
Case PGR2020-00059—Petition for Post-Grant Review of U.S. Pat. No. 10,477,772 filed May 1, 2020.
Case PGR2020-00060—Petition for Post-Grant Review of U.S. Pat. No. 10,485,176 filed May 1, 2020.
Case PGR2020-00061—Petition for Post-Grant Review of U.S. Pat. No. 10,524,420 filed May 1, 2020.
16 CFR part 1205 (2012).
Black and Decker CM2040 electric lawn mower (56 pages) undated.
Cub Cadet CC 500 BAT electric lawn mower (50 pages) undated.
Earthwise CST00012 electric string trimmer (12 pages) undated.
Greenworks 21052 electric string trimmer (29 pages) undated.
Greenworks 21212 electric string trimmer (26 pages) undated.
Homelite UT41110 electric trimmer (16 pages) undated.

(56) References Cited

OTHER PUBLICATIONS

Neuton CE6 electric lawn mower (74 pages) undated.
Recharge Ultralite PMLI-14 electric lawn mower (25 pages) undated.
Ryobi RY14110 electric lawn mower (63 pages) undated.
Ryobi RY40100 electric lawn mower (80 pages) undated.
Sun Joe SB600E electric trimmer (15 pages) undated.
Toro e-Cycler 20360 electric lawn mower (12 pages) undated.
Worx WG789 electric lawn mower (58 pages) undated.
United States Patent and Trademark Office, Non-Final Office Action issued on U.S. Appl. No. 15/250,476, Notification Date Oct. 13, 2017, 17 pages.
United States Patent and Trademark Office, Non-Final Office Action issued on U.S. Appl. No. 15/250,516, Notification Date Oct. 13, 2017, 16 pages.
United States Patent and Trademark Office, Final Office Action issued on U.S. Appl. No. 15/250,476, dated Mar. 1, 2018, 11 pages.
United States Patent and Trademark Office, Office Action issued on U.S. Appl. No. 15/238,276, Notification Date Feb. 26, 2019, 14 pages.
United States Patent and Trademark Office, Final Office Action issued on U.S. Appl. No. 15/238,276, Notification Date of Aug. 2, 2019, 7 pages.
One World's Initial Invalidity Contentions, Case No. 19-1293-LPS (49 pages).
One World's Initial Invalidity Contentions Exhibits A-1-A-2 463 Chart, Case No. 19-1923-LPS (19 pages).
One World's Initial Invalidity Contentions Exhibits B-1-B-6 806 Chart, Case No. 19-1923-LPS (72 pages).
One World's Initial Invalidity Contentions Exhibits C-1-C-2 686 Chart, Case No. 19-1923-LPS (37 pages).
One World's Initial Invalidity Contentions Exhibit D-1 686 Chart, Case No. 19-1923-LPS (35 pages).
One World's Initial Invalidity Contentions Exhibits E-1-E-4 588 Chart, Case No. 19-1923-LPS (124 pages).
One World's Initial Invalidity Contentions Exhibits F-1-F-2 805 Chart, Case No. 19-1923-LPS (37 pages).
American National Standard for Consumer Turf Care Equipment, "Pedestrian-Controlled Mowers and Ride-On Mowers Safety Specifications," published Apr. 23, 2012, pp. 16-17.
Non-final Office Action from U.S. Appl. No. 16/824,858, dated Jun. 5, 2023, 11 pp.

* cited by examiner

10

1141

1311

101

1141

1311

342

343

341

HAND-PUSHED POWER TOOL AND HANDLE DEVICE THEREOF

RELATED APPLICATION INFORMATION

This application is a continuation of International Application Number PCT/CN2022/101474, filed on Jun. 27, 2022, through which this application also claims the benefit under 35 U.S.C. § 119(a) of Chinese Patent Application No. 202110729715.0, filed on Jun. 29, 2021, and Chinese Patent Application No. 202121463161.6, filed on Jun. 29, 2021, which applications are incorporated herein by reference in their entirety.

BACKGROUND

A mower is generally a machine used by a user to mow home lawns. A common mower has a tool body and a handle device, and the handle device can be movably connected to the tool body. The user can control, by pushing the handle device, the mower to walk and mow grass. However, various control switches and controllers on the handle device need to communicate with a controller of the tool body. Thus, the handle device typically has a hollow connecting rod assembly in which various electrical connecting wires are disposed. During the expansion and retraction of the connecting rod assembly, the connecting wires are also easily damaged, resulting in unstable or ineffective control performance between the handle device and the tool body. In addition, a complex wiring mode in the connecting rod assembly also increases the difficulty of subsequent maintenance.

SUMMARY

A hand-pushed power tool includes: a tool body including a working assembly and a control unit for controlling running of the working assembly; and a handle device connected to the tool body. The handle device includes: an operation member including a grip for a user to hold; a connecting rod assembly including a first connecting rod connected to the tool body, wherein the first connecting rod includes a first lower rod portion and a first upper rod portion, the first lower rod portion is connected to the tool body, the first upper rod portion is connected to the operation member and slidable relative to the first lower rod portion along a first straight line to a retracted position and an expanded position, the handle device is in a retracted state when the first upper rod portion is in the retracted position, and the handle device is in an expanded state when the first upper rod portion is in the expanded position; a detection device including a first detection element for detecting a telescopic state of the handle device; and a control device mounted to the operation member and electrically or communicatively connected to the first detection element. The control device is configured to control the control unit according to detection information from the first detection element.

In some examples, the first detection element is a Hall sensor.

In some examples, the detection device further includes a second detection element which is a magnetic member or a magnetically conductive element cooperating with the Hall sensor, where the second detection element is mounted to the first lower rod portion or mounted in a housing fixedly connected to the first lower rod portion.

In some examples, the first detection element is electrically connected to the control device through a first connecting wire.

In some examples, the control device is disposed in a mounting housing.

In some examples, the handle device further includes a second connecting wire connecting the control device to the control unit.

In some examples, the second connecting wire passes through the first connecting rod.

In some examples, the first connecting rod is connected to an end of the operation member, the handle device further includes a second connecting rod connected to another end of the operation member, and the second connecting wire passes through the second connecting rod.

In some examples, the operation member includes a mounting housing connected to the grip or the first connecting rod, where the first detection element is at least partially disposed in the mounting housing.

In some examples, the first detection element is disposed at an end of the mounting housing close to the first connecting rod.

In some examples, the handle device further includes a second connecting rod connecting the operation member to the tool body and a connection housing connecting the first connecting rod to the second connecting rod, and the detection device further includes a second detection element, where the first detection element is a Hall sensor, the second detection element is a magnetic member or a magnetically conductive element cooperating with the Hall sensor, and the second detection element is at least partially disposed in the connection housing.

In some examples, the first detection element is mounted to an end portion of the first upper rod portion close to the first lower rod portion.

In some examples, the first detection element is at least partially disposed in the first upper rod portion.

In some examples, the first connecting wire passes through the first upper rod portion to be connected to the control device.

In some examples, the first detection element is a switch element, and the detection device further includes a triggering member cooperating with the switch element.

In some examples, the first detection element is a Hall sensor, and the triggering member is a magnetic member or a magnetically conductive element cooperating with the Hall sensor.

In some examples, the first detection element is a contact switch.

In some examples, the control device is configured to, when the detection information from the first detection element increases or decreases to a preset parameter value, control the control unit to be incapable of running.

A handle device includes: an operation member including a grip for a user to hold; a connecting rod assembly including a first connecting rod connected to a tool body, wherein the first connecting rod includes a first lower rod portion and a first upper rod portion, the first lower rod portion is connected to the tool body, the first upper rod portion is connected to the operation member and slidable relative to the first lower rod portion along a first straight line to a retracted position and an expanded position, the handle device is in a retracted state when the first upper rod portion is in the retracted position, and the handle device is in an expanded state when the first upper rod portion is in the expanded position; a detection device including a first detection element for detecting a telescopic state of the handle device; and a control device mounted to the operation member and electrically or communicatively connected to the first detection element. The control device is configured to control a working assembly of the tool body to work according to detection information from the first detection element.

A mower includes: a tool body including a cutting assembly and a cutting motor for controlling the cutting assembly to perform a cutting function; and a handle device connected to the tool body. The handle device includes: an operation member including a grip for a user to hold; a connecting rod assembly including a first connecting rod connected to the tool body, wherein the first connecting rod includes a first lower rod portion and a first upper rod portion, the first lower rod portion is connected to the tool body, the first upper rod portion is connected to the operation member and slidable relative to the first lower rod portion along a first straight line to a retracted position and an expanded position, the handle device is in a retracted state when the first upper rod portion is in the retracted position, and the handle device is in an expanded state when the first upper rod portion is in the expanded position; a detection device including a first detection element for detecting a telescopic state of the handle device; and a control device mounted to the operation member and electrically or communicatively connected to the first detection element. The control device is configured to control the cutting motor according to detection information from the first detection element.

DETAILED DESCRIPTION

Figure 1:
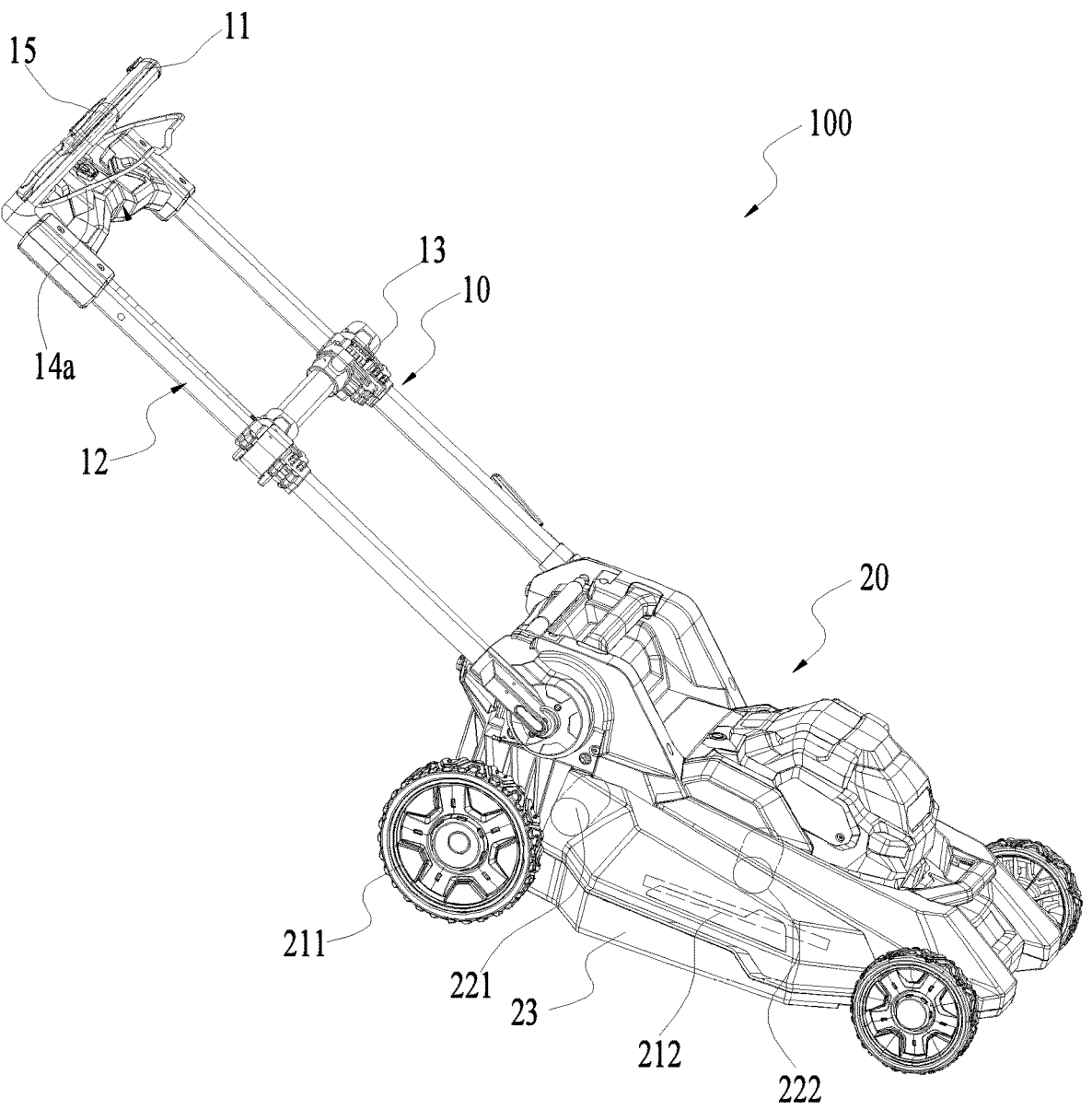
FIG. 1 is a perspective view of a mower.

The present application is described below in detail in conjunction with drawings and examples. It is to be understood that the examples described herein are intended to illustrate and not to limit the present application. Additionally, it is to be noted that for ease of description, only part, not all, of structures related to the present application are illustrated in the drawings.

It is to be understood that a handle device in the present application is applicable to a mower and other large garden power tools such as a snow thrower and a blower. In this example, the mower is used as an example for description.

Referring to FIG. 1, a mower 100 is a hand-pushed power tool. The mower 100 includes a tool body 20 and a handle device 10. The tool body 20 includes at least a working assembly and a control unit, where the working assembly may include a walking assembly 211 such as walking wheels and a cutting assembly 212 such as a cutting blade, and the control unit may include a drive motor 221 controlling the walking assembly 211 to walk and a cutting motor 222 controlling the cutting assembly 212 to perform a cutting function. The tool body 20 may further include a chassis 23, where the chassis 23 can accommodate the cutting assembly 212, and the walking assembly 211 can support the chassis 23.

The handle device 10 is connected to the tool body 20, where the handle device 10 is connected to a rear end of the tool body 20. The handle device 10 is operated by a user. The handle device 10 is also rotatable relative to the tool body 20 to be adapted to users with different heights. The handle device 10 is also rotatable relative to the tool body 20 to a folded state, and in this case, the mower 100 occupies a relatively small space, thereby facilitating the storage of the mower 100.

As shown in FIGS. 1 to 7, the handle device 10 includes at least an operation member 11, a connecting rod assembly 12, and a housing 13. The operation member 11 includes a grip 111 for the user to hold, a first mounting portion 112, and a second mounting portion 113, where the first mounting portion 112 and the second mounting portion 113 are disposed at two ends of the grip 111 separately. In this example, the first mounting portion 112 extends along a first straight line 11a, and the second mounting portion 113 extends along a second straight line 11b parallel to the first straight line 11a. When the user needs to push the mower to mow grass, the user may stand behind the handle device 10 and hold the grip 111 by hand to apply a forward thrust to the grip 111 so that the mower 100 can be driven to walk on the ground.

The connecting rod assembly 12 is used for connecting the operation member 11 to the tool body 20. The connecting rod assembly 12 includes a first connecting rod 121 and a second connecting rod 122, where one end of the first connecting rod 121 is connected to the tool body 20, the other end of the first connecting rod 121 is connected to the first mounting portion 112, one end of the second connecting rod 122 is connected to the tool body 20, and the other end of the second connecting rod 122 is connected to the second mounting portion 113. The first connecting rod 121 extends along the first straight line 11a, and the second connecting rod 122 extends along the second straight line 11b parallel to the first straight line 11a.

The housing 13 extends along a left and right direction and connects the first connecting rod 121 to the second connecting rod 122. The handle device 10 further includes a trigger 14a for starting the cutting blade, where the trigger 14a is rotatably connected to the operation member 11. The housing 13 is formed with a first accommodation cavity 131, where the first connecting rod 121 extends along the first straight line 11a into the first accommodation cavity 131. The housing 13 is also fixedly connected to the connecting rod assembly 12.

A wireless remote control device 15 is further disposed on the handle device 10. Therefore, the handle device 10 in this example is a wireless remote control handle device. In this example, the wireless remote control device 15 is disposed on the left or right of the operation member 11 or in the middle of the operation member 11 so as to facilitate the manipulation of the wireless remote control device 15 by the user. The wireless remote control device 15 may output control information to the control unit of the tool body 20 in a wireless communication manner, thereby controlling a working state of the tool body 20. A communication manner of the wireless remote control device 15 may be optical communication such as infrared communication or ultraviolet communication or may be radio frequency communication, Bluetooth communication, ZigBee communication, or the like.

Figure 9:
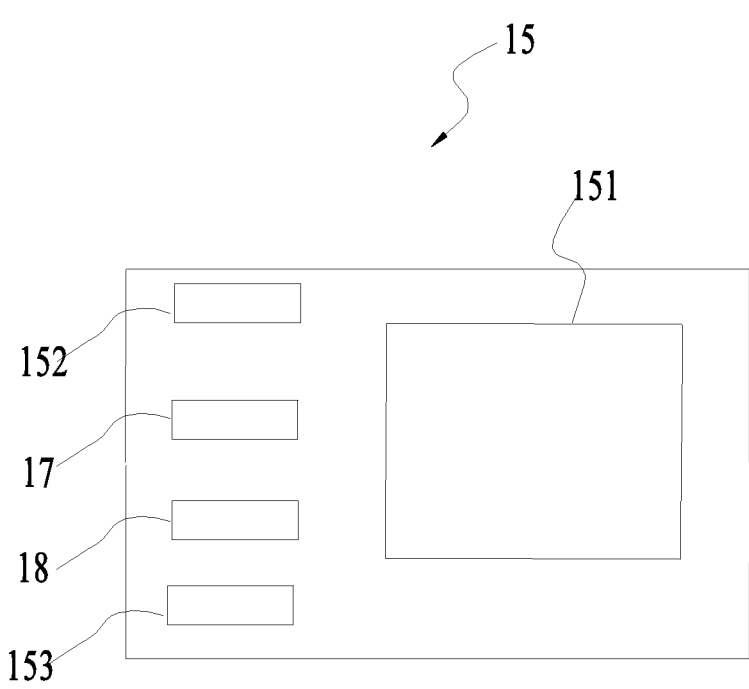
FIG. 9 is a schematic diagram of a wireless remote control device of a handle device of the mower in FIG. 1.

In an example, as shown in FIG. 9, the wireless remote control device 15 may include a display module 151 for displaying a current working state of the mower 100, such as a walking speed of the mower 100, cutting strength of the cutting blade, or other state information.

In an example, the wireless remote control device 15 may also include an input module 152 such as an input key or a touch key for the user to input an operation instruction or view historical state information.

In an example, the wireless remote control device 15 includes a data sending module 153 for outputting the control information in the wireless communication manner. Accordingly, the tool body 20 also includes a data reception module (not shown) for receiving information sent by the data sending module 153. Optionally, a position of the data sending module 153 and a position of the data reception module may be exchanged.

In this example, the wireless remote control device 15 is independently powered by a power supply module 16. The power supply module 16 may be one or more of a detachable button cell, a rechargeable battery, a solar cell, and a power bank. For example, the button cell may be used for powering the wireless remote control device 15, and the button cell whose capacity is more than 100 mAh may be selected. Multiple button cells may be provided, where the multiple button cells are built in the handle device 10 and connected in series or in parallel. The power supply module 16 may be detachably connected to the handle device 10 through a metal flat spring or a spring structure, may be detachably fixed on the handle device 10 through a screw, or may be detachably disposed on the handle device 10 through a peripheral power interface such as a type-c interface. In an example, the power supply module 16 is the rechargeable battery, where a charging port of the rechargeable battery may be disposed on the handle device 10.

In this example, the wireless remote control device 15 is powered by the power supply module 16 mounted to the handle device 10. In this case, after the wireless remote control device 15 is detached from the handle device 10, the power supply module 16 mounted to the handle device 10 is electrically disconnected from the wireless remote control device 15, and the wireless remote control device 15 has no power supply. In this case, a communication connection between the wireless remote control device 15 and the tool body 20 is interrupted. This manner is conducive to preventing the wireless remote control device 15 from being lost.

In an example, the power supply module 16 may be a flexible solar cell such as a solar cell panel. The solar cell panel may absorb light energy and convert the light energy to electrical energy to power the wireless remote control device 15. Optionally, the solar cell panel may be disposed on the connecting rod assembly 12 and/or the grip 111 and/or the housing 13. Optionally, the solar cell panel may be disposed on the operation member 11 or may be disposed next to the wireless remote control device 15. In summary, the solar cell panel needs to be capable of receiving enough light energy to power the wireless remote control device 15 and will not fail to power the wireless remote control device 15 despite a power decrease due to occasional occlusion by a hand. It is to be understood that as long as the solar cell panel is disposed on the handle device 10, the solar cell panel may be connected to the wireless remote control device 15 through a relatively short electrical connecting wire even if the solar cell panel is a little distant from the wireless remote control device 15. Since the electrical connecting wire is disposed between the solar cell panel and the wireless remote control device 15 and the distance therebetween is relatively short, an effect of the electrical connecting wire on the complexity of a circuit design is within an acceptable range.

In an example, a ratio of a coverage area of the solar cell panel on the handle device 10 to an area of the handle device 10 is 20% to 50%. It is to be understood that the solar cell panel may be split into several small panels disposed in different positions of the handle device 10 so that the small panels can obtain more adequate light, thereby ensuring the continuity and adequacy of the power supply. The several small solar cell panels may unify the electrical energy through electrical connections and then supply the electrical energy to the wireless remote control device 15. The coverage area of the solar cell panel on the handle device 10 is set and the number of panels is not limited so that the solar cell panel is disposed with higher flexibility while adequate solar power supply is ensured. In addition, it is set that the coverage area of the solar cell panel occupies 20% to 50% of the area of the handle device 10, which ensures that the solar cell panel is capable enough to obtain adequate light for powering the wireless remote control device 15 and also prevents an effect of the solar cell panel on an appearance of the handle device 10 or other structures of the handle device 10. In an example, multiple solar cell panels disposed on the handle device 10 may separately power the wireless remote control device 15 so that when one solar cell panel fails or is damaged, other solar cell panels may be used for powering the wireless remote control device 15. In an example, the solar cell panel may also be used for charging the rechargeable battery.

In this example, the mower 100 further includes an alarm module 17, where when the wireless remote control device 15 outputs the control information, the alarm module 17 can send alarm prompt information to inform the user that a control instruction is successfully sent. Optionally, the alarm module 17 may be integrated in the wireless remote control device 15 or may be separately disposed in another position of the handle device 10. The alarm module 17 may perform wireless communication with the wireless remote control device 15, and a communication protocol between the alarm module 17 and the wireless remote control device 15 is different from or the same as a communication protocol between the wireless remote control device 15 and the tool body 20. In an example, the alarm module 17 may provide a voice prompt, a flash prompt, a voice plus flash prompt, or other forms of prompts such as a buzz. In an example, the alarm module 17 may be powered independently or may be powered by the same power supply module 16 as the wireless remote control device 15.

In this example, a safety control module 18 is also included. The safety control module 18 may be integrated in the wireless remote control device 15 or may be separately disposed in another position of the handle device 10. The safety control module 18 may encrypt the control information output by the wireless remote control device 15. It is to be understood that when outputting the control information, the wireless remote control device 15 may output an alarm instruction to the alarm module 17 to provide an alarm prompt so that the safety control module 18 encrypts different output information to prevent information crosstalk. Since different encryption manners are used for different wireless communication manners, the safety control module 18 may match an appropriate information encryption technology with the communication manner used by the wireless remote control device 15.

In this example, the wireless remote control device 15 may perform wireless communication in real time or may perform wireless communication after waking up at a preset frequency, which can reduce the standby power consumption of a wireless communication module and improve the service life of the power supply module 16.

In this example, the first connecting rod 121 and the second connecting rod 122 are collectively referred to as telescopic rods. The cutting blade on the chassis 23 of the mower 100 easily injures the user by mistake. Therefore, when the mower 100 is designed, the mower 100 is required to start mowing only when the telescopic rods are in a completely expanded state; and when the telescopic rods are in a completely retracted state or an intermediate state between the completely expanded state and the completely retracted state, the machine is not started or is controlled to stop working. As shown in FIGS. 2 to 5, a locking mechanism 101 is further disposed on the handle device 10, where when the telescopic rods are in the completely expanded state or the completely retracted state, the locking mechanism 101 can lock the state, thereby preventing the telescopic rods from sliding. That is to say, when the telescopic rods are in the completely retracted state, the locking mechanism 101 is also in a locked state. Therefore, there is a potential safety hazard when the mower is controlled to start working only by determining the locked state of the locking mechanism 101. To prevent this case, based on the locked state of the locking mechanism 101, a safety control device needs to be provided to detect a telescopic state of a telescopic rod. The so-called telescopic state includes the completely expanded state of the telescopic rod, that is, the first connecting rod 121, the completely retracted state of the telescopic rod, and the intermediate state of the telescopic rod between the preceding two states.

Figure 8:
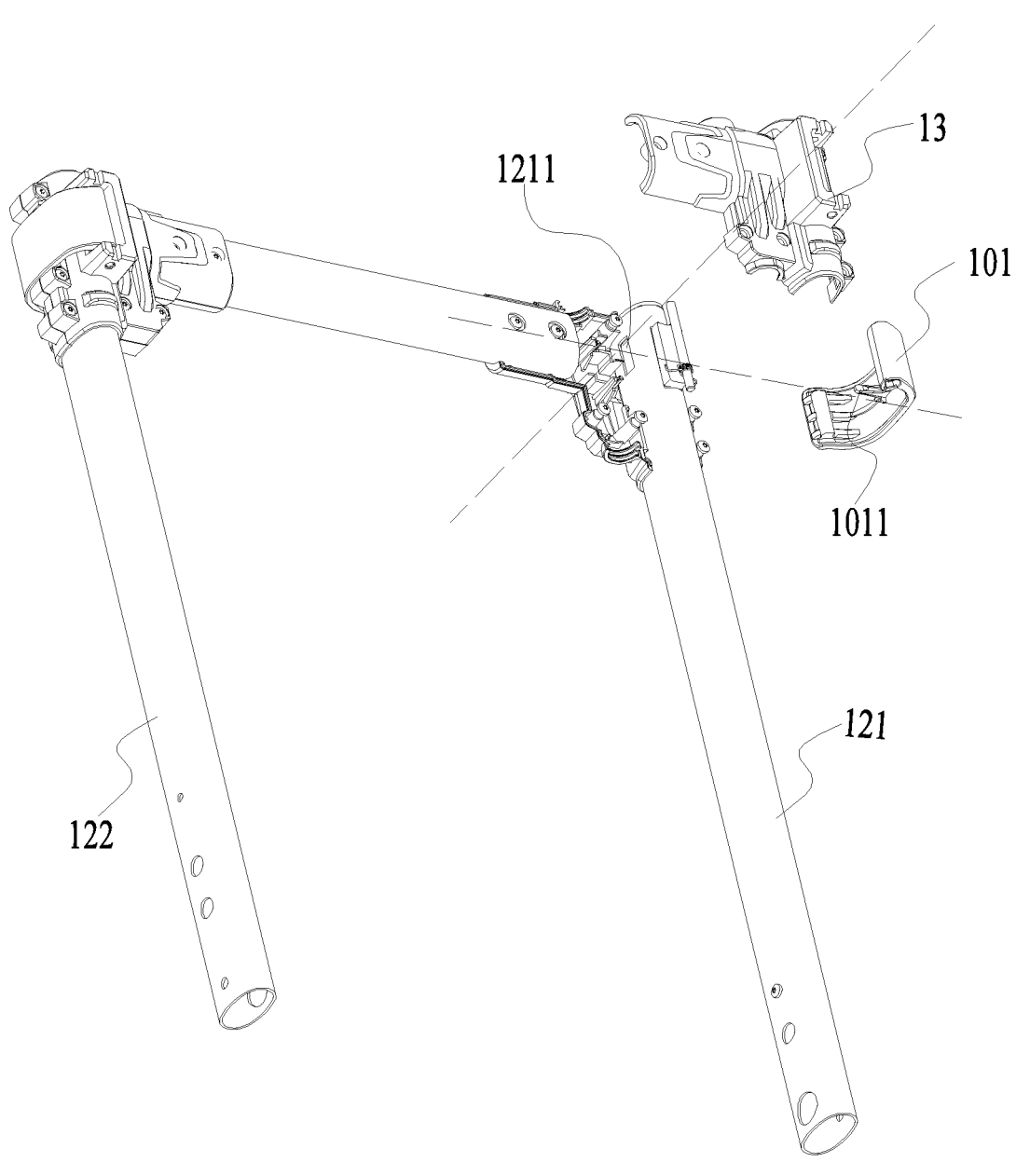
FIG. 8 is an exploded view of a locking mechanism in a handle device of the mower in FIG. 1.

In an implementation, as shown in FIG. 8, a pin 1011 is disposed on the locking mechanism 101. Accordingly, an insertion hole 1211 is disposed on the first connecting rod 121, where after the pin 1011 is inserted into the insertion hole 1211, the connecting rod assembly 12 may be fixed in a connected state, and when the pin 1011 is not inserted into the insertion hole 1211, the connecting rod assembly may slide freely. Optionally, the locking mechanism 101 may be other forms of fixing structures, which is not listed one by one here.

Figure 2:
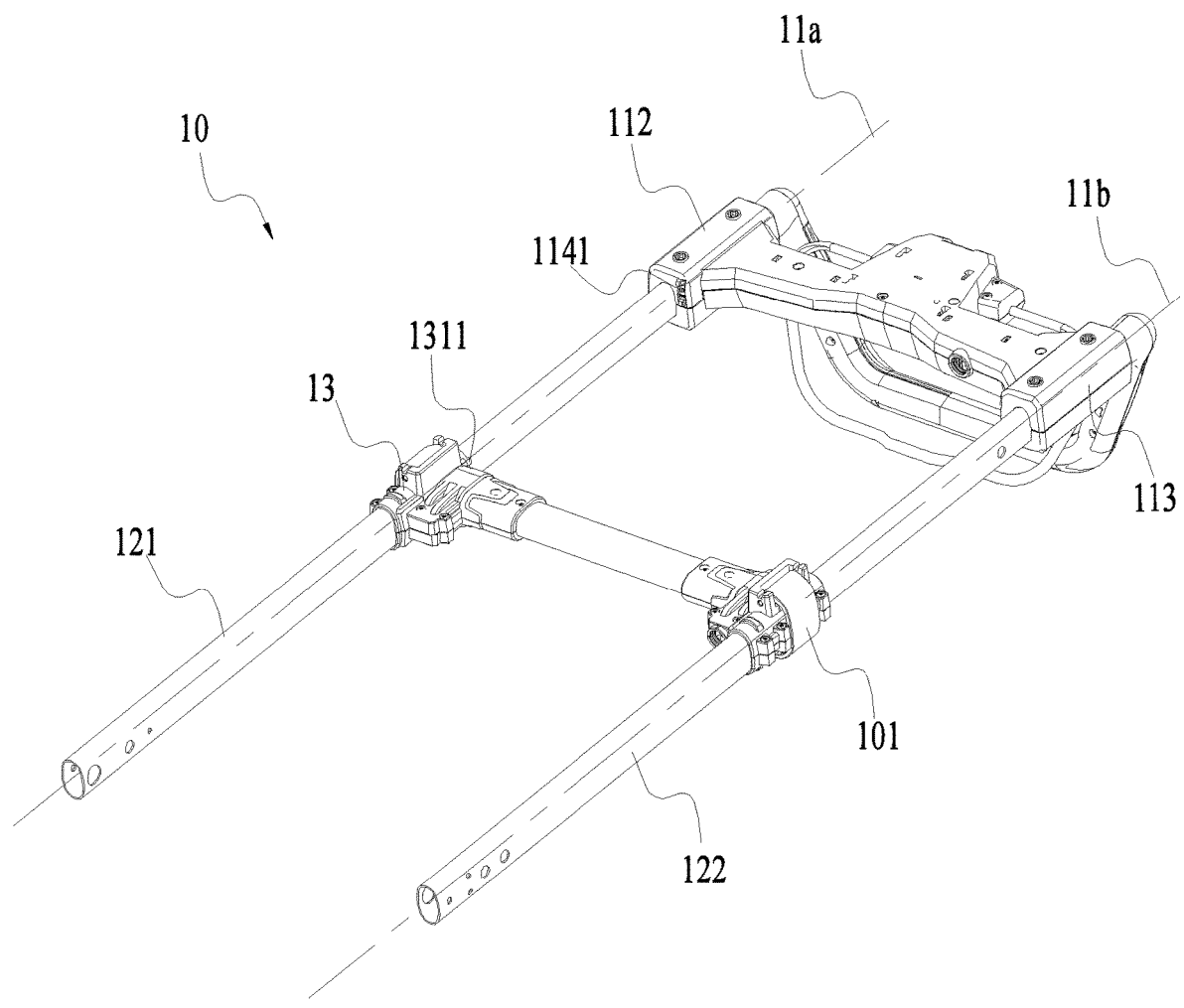
FIG. 2 is a perspective view of a handle device of the mower in FIG. 1, where the handle device is in an expanded state.
Figure 3:
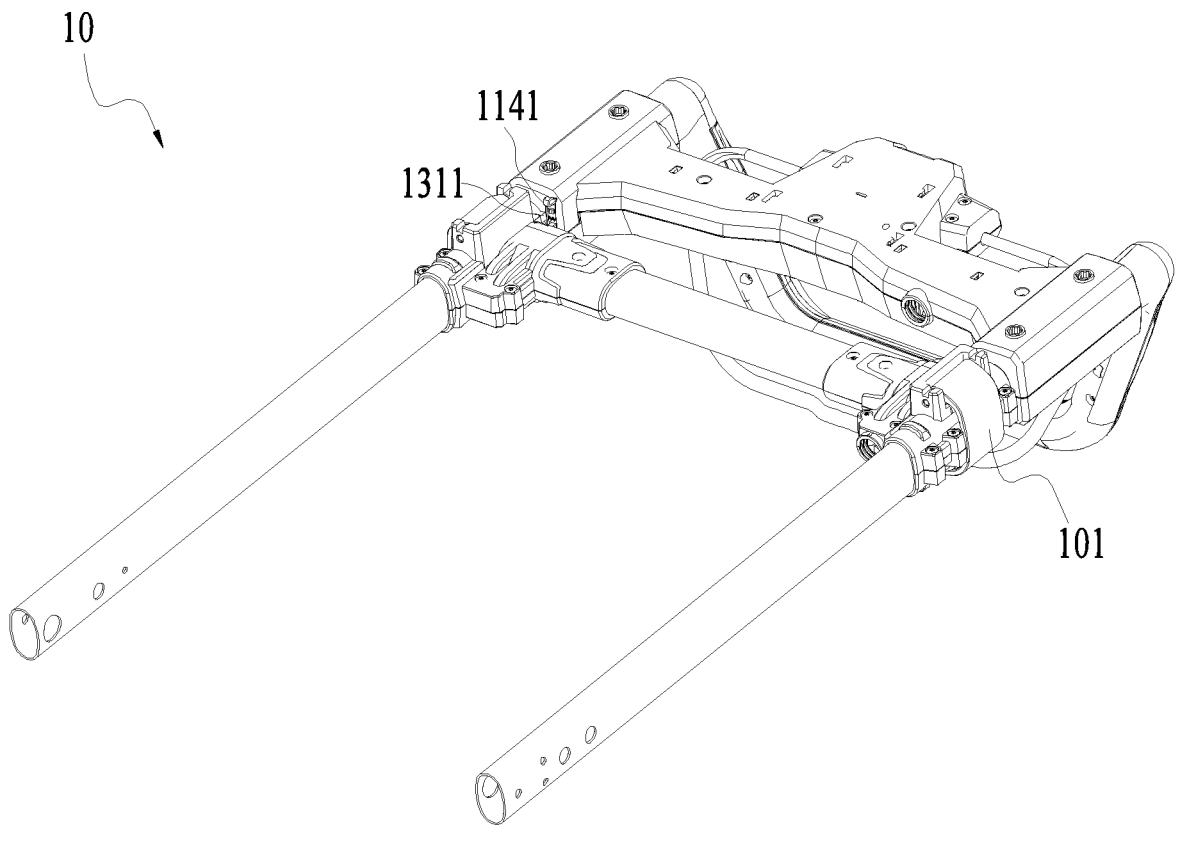
FIG. 3 is a perspective view of a handle device of the mower in FIG. 1, where the handle device is in a retracted state.
Figure 4:
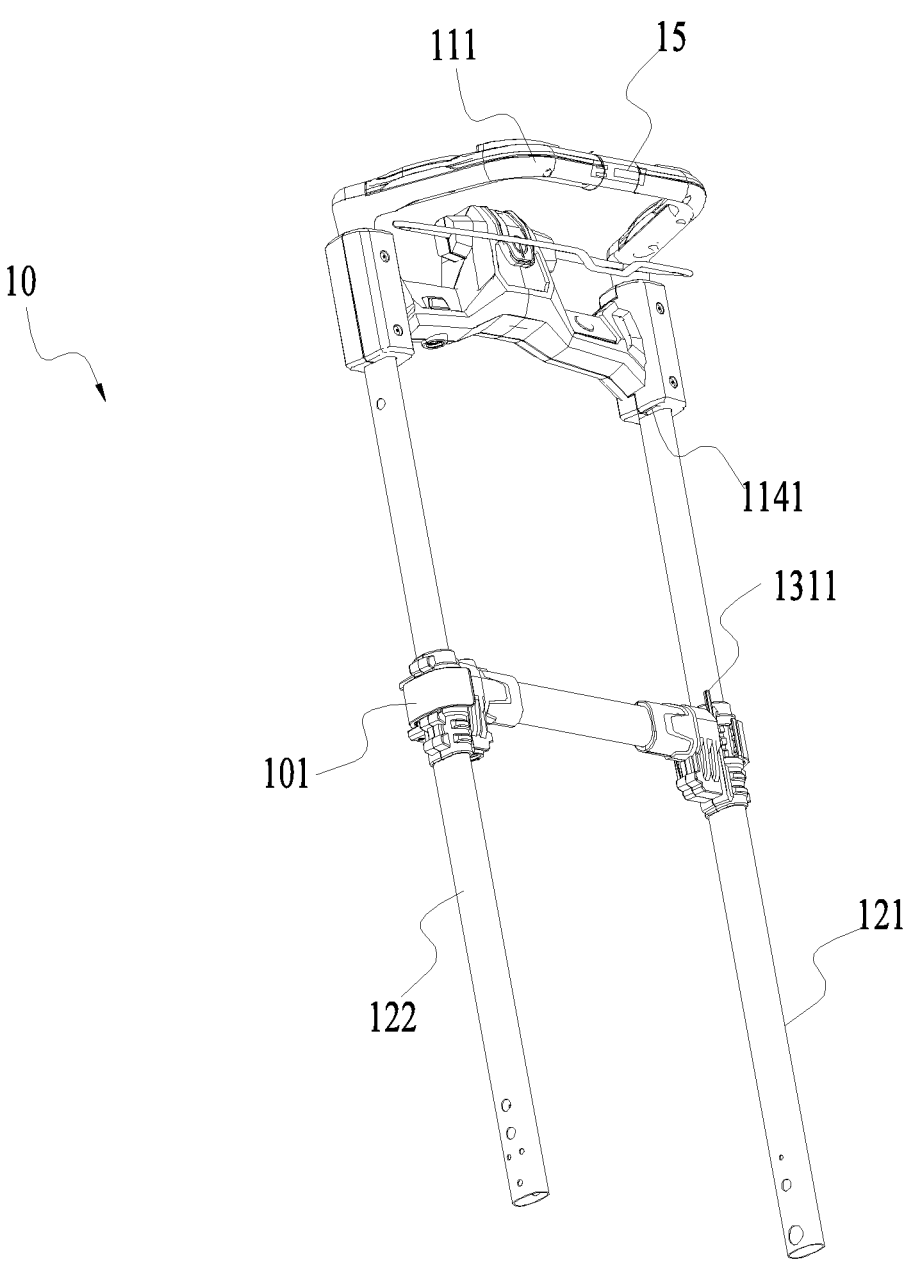
FIG. 4 is another perspective view of a structure shown in FIG. 2.
Figure 5:
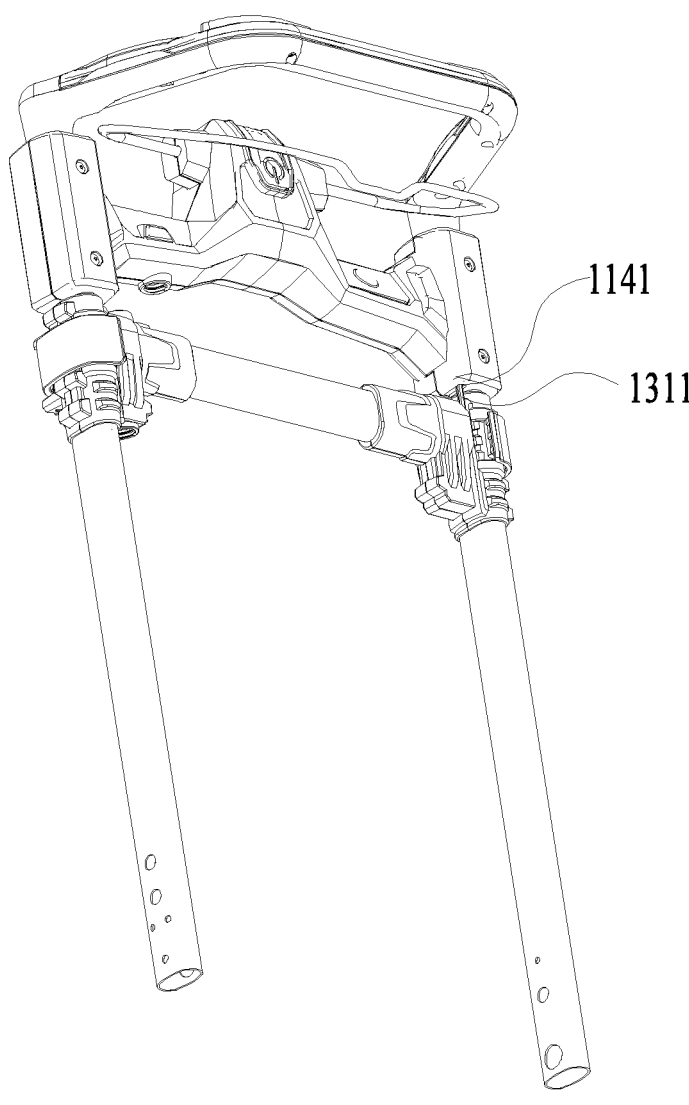
FIG. 5 is another perspective view of a structure shown in FIG. 3.
Figure 6:
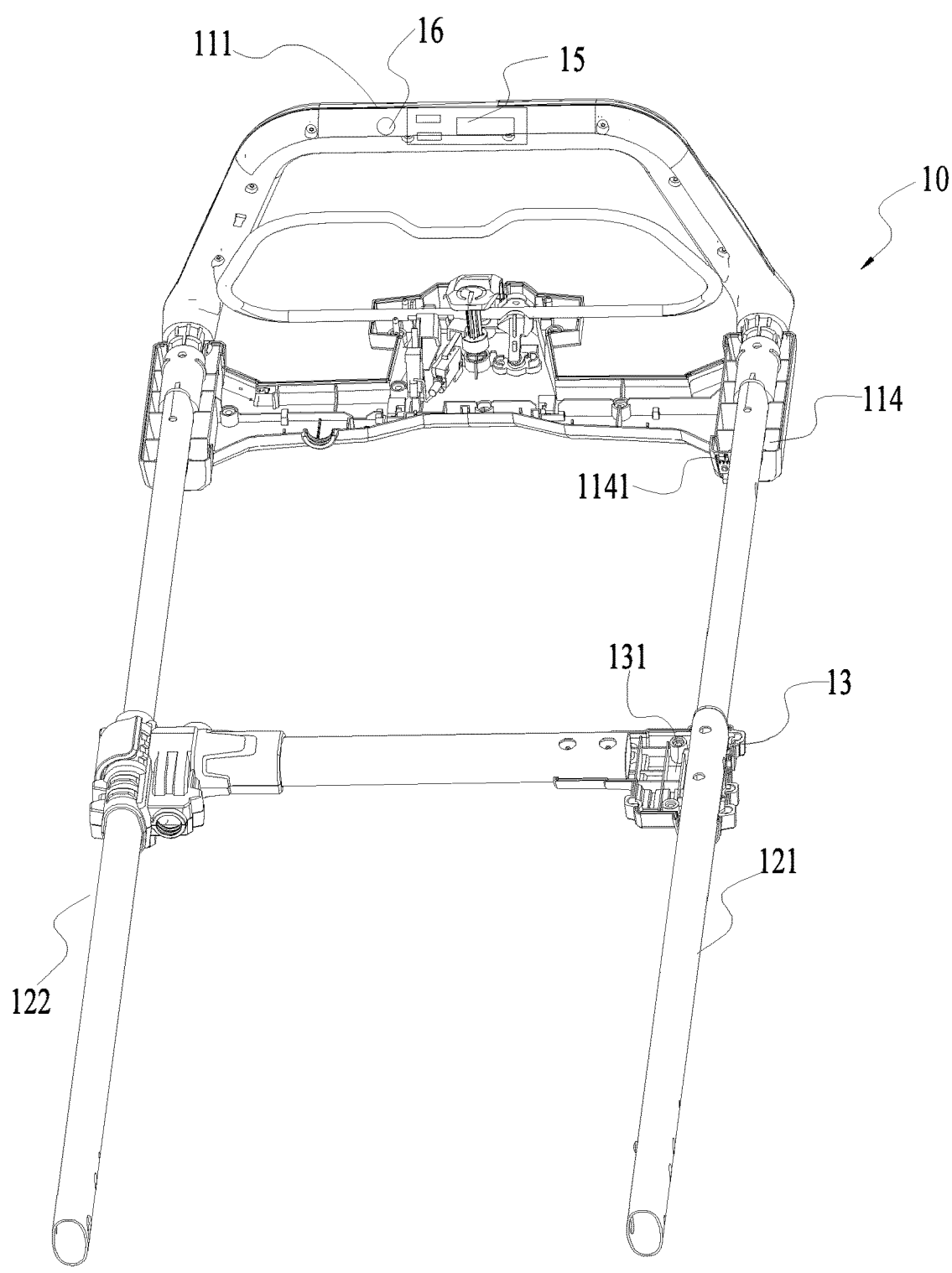
FIG. 6 is a structure view of a handle device of the mower in FIG. 1 with part of a housing removed.

As shown in FIGS. 3 and 5, the first connecting rod 121, that is, the telescopic rod, is in the completely retracted state. As shown in FIGS. 2 and 4, the first connecting rod 121 is in the completely expanded state. The intermediate state is between the preceding two states. Specifically, to detect the telescopic state of the telescopic rod, a first detection element 1141 used for detecting the telescopic state of the telescopic rod and electrically connected to the wireless remote control device 15 is disposed on the operation member 11 of the handle device 10. Accordingly, a second detection element 1311 is disposed on the housing 13. It is to be understood that the first detection element 1141 and the operation member 11 constitute a first whole and move together, and the second detection element 1311 and the connecting rod assembly 12 constitute a second whole and move together. Thus, a position of the second detection element 1311 in a direction of the first straight line 11$a$ remains unchanged along with the connecting rod assembly 12, and the first detection element 1141 moves along with the operation member 11 so that a distance between the first detection element 1141 and the second detection element 1311 is changed.

It is to be understood that the first detection element 1141 may be completely disposed in a second accommodation cavity 114 formed by the operation member 11, may be partially disposed in the second accommodation cavity 114, or may be completely disposed on a surface of the first mounting portion 112 of the operation member 11 or a surface of the second mounting portion 113 of the operation member 11. The second detection element 1311 may be completely disposed in the first accommodation cavity 131 formed by the housing 13, may be partially disposed in the first accommodation cavity 131, or may be disposed on an outer surface of the housing 13. Optionally, the first detection element 1411 and the second detection element 1311 may be disposed on a straight line parallel to the first straight line 11$a$ or a straight line not parallel to the first straight line 11$a$.

In an example, the first detection element 1141 and the second detection element 1311 can sense each other. In addition, as the telescopic rod is continuously expanded, the distance between the first detection element 1141 and the second detection element 1311 continuously increases so that signals of the first detection element 1141 and the second detection element 1311 sensed by each other have gradually reduced strength. Therefore, the wireless remote control device 15 may determine the expanded state of the telescopic rod according to the magnitude of the strength of the signals sensed by the first detection element 1141 and the second detection element 1311. For example, the first detection element 1141 can sense an intermediate parameter representing the distance between the first detection element 1141 and the second detection element 1311 and then transmits the parameter to the wireless remote control device 15. The wireless remote control device 15 determines the distance between the first detection element 1141 and the second detection element 1311 according to the acquired intermediate parameter and determines the telescopic state of the telescopic rod. Optionally, the first detection element 1141 may directly determine the distance between the first detection element 1141 and the second detection element 1311 according to the sensed intermediate parameter, determine the telescopic state of the telescopic rod, and then transmit the telescopic state to the wireless remote control device 15. When the telescopic rod is in the completely retracted state or the intermediate state, the wireless remote control device 15 controls a main control unit 22 of the tool body 20 to remain unstarted or controls the working assembly of the tool body 20 in the working state to stop working.

In an example, the first detection element 1141 and the second detection element 1311 may be any detection elements which can sense the distance therebetween mutually or unidirectionally. For example, the first detection element 1141 and the second detection element 1311 may mutually sense the distance between each other in such a manner as mutual magnetic induction, mutual optical induction, or mutual acoustic induction.

In an implementation, the first detection element 1141 is a Hall device, and the second detection element 1311 is a magnetic member or a magnetically conductive element. A Hall element can sense a magnitude of a magnetic flux between the Hall element and the magnetic member or the magnetically conductive element. It is to be noted that the larger a distance between the Hall element and the magnetic member or the magnetically conductive element, the smaller the magnetic flux sensed by the Hall element. When the magnetic flux sensed by the Hall element is smaller than or equal to a magnetic flux threshold, the first connecting rod 121 may be considered to be in the completely expanded state. When the magnetic flux is larger than the magnetic flux threshold, the first connecting rod 121 may be considered to be in the completely retracted state or the intermediate state. Thus, the wireless remote control device 15 may output a control signal to the main control unit 22 of the tool body 20 to control the working assembly on the tool body 20 to stop working or not to start when the magnetic flux is larger than the magnetic flux threshold and to start working when the magnetic flux is smaller than or equal to the magnetic flux threshold.

It is to be understood that when the wireless remote control device 15 determines, according to the magnitude of the obtained magnetic flux, that the telescopic rod is in the completely expanded state, the locking mechanism 101 is also in the locked state. That is to say, the first connecting rod 121 and the second connecting rod 122 are in a completely expanded and fixed state, and the mower 100 may start mowing.

In an example, the magnetic member or the magnetically conductive element may have an arbitrary shape. The Hall device may be disposed on a surface of an operation element, and the magnetic member or the magnetically conductive element may be disposed on the surface of the housing 13. Thus, an effect of the housing 13 on the strength of a magnetic field or the magnitude of the magnetic flux can be reduced.

In an example, the first detection element 1141 or the second detection element 1311 may be a switch element having only two determinate states. For example, the first detection element 1141 may be a switch element having a first switch state and a second switch state. The second detection element 1131 is a triggering element for triggering the switch element to switch a switch state of the switch element. Specifically, when the first connecting rod 121 is in the completely expanded state or the intermediate state, the switch element is not in contact with the triggering element, and the switch element is in the first switch state; and when the first connecting rod 121 is in the completely retracted state, the switch element is in contact with the triggering element, and the switch element is in the second switch state. In particular, if the triggering element is relatively long or a position of the triggering element is changed, the switch element is in the second switch state and the first connecting rod 121 may still be in the intermediate state when the triggering element is in contact with the switch element. The first switch state may be an off state, and the second switch state may be an on state. That is to say, when the switch element is in the on state, the first connecting rod 121 is in the completely retracted state or the intermediate state. Therefore, the wireless remote control device 15 may determine the telescopic state of the telescopic rod by detecting the state of the switch element. Further, when the switch element is in the first switch state, that is, the off state, it may be determined that the telescopic rod is in the completely expanded state or the intermediate state, and in conjunction with the locked state of the locking mechanism 101, the working assembly of the tool body 20 is controlled to work; and when the switch element is in the second switch state, that is, the on state, it may be determined that the telescopic rod is in the completely retracted state or the intermediate state, and the working assembly of the tool body 20 may be directly controlled to stop working or not to start.

In this example, detection elements are disposed on the operation member 11 of the mower 100 and the housing 13 of the mower 100 separately to detect the telescopic state of the telescopic rod, which prevents complex connecting wires and ensures the accuracy with which the state of the telescopic rod is determined. In addition, in conjunction with the locking mechanism 101, the mower 100 is controlled to start, thereby improving the control safety of the mower 100.

Figure 7:
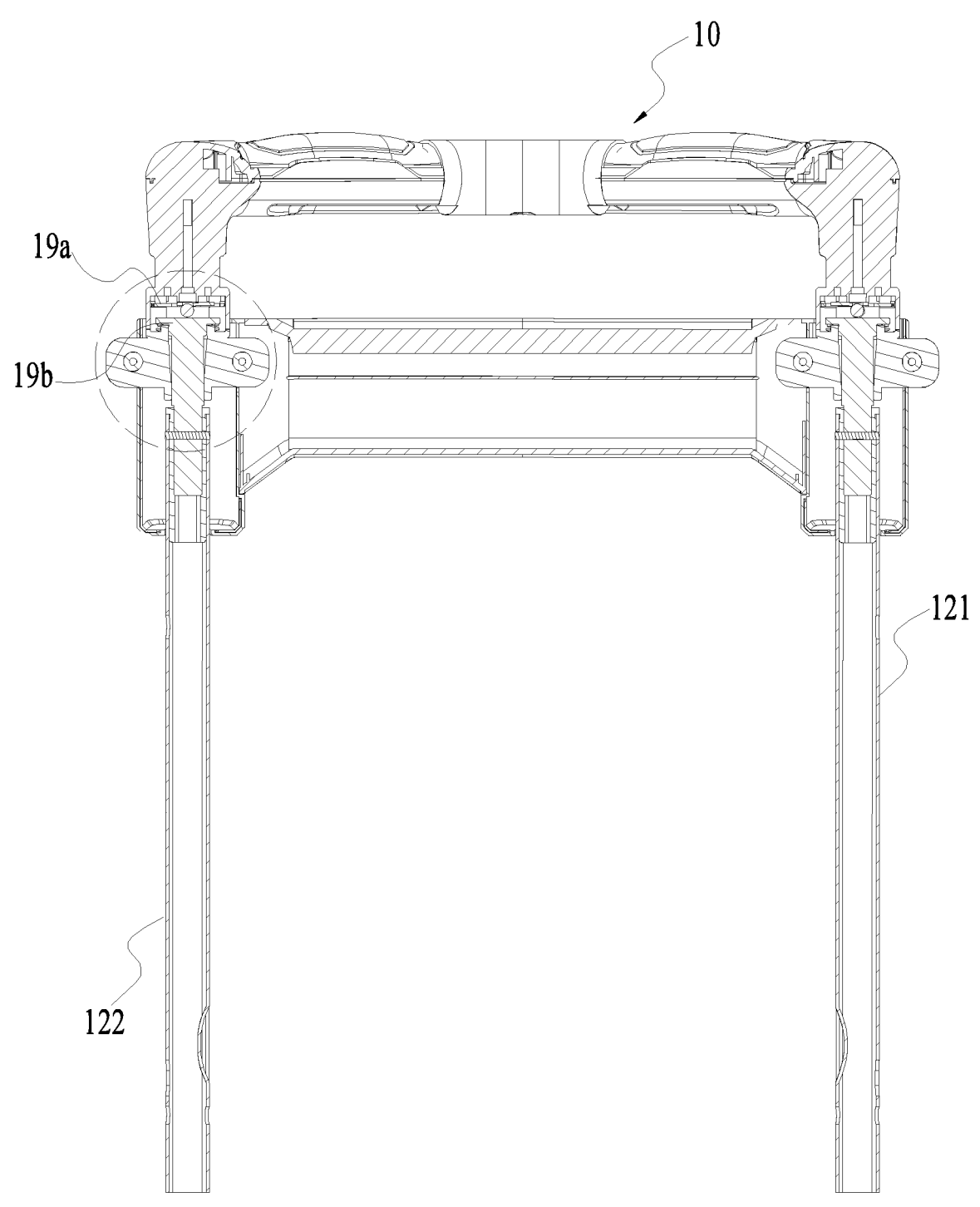
FIG. 7 is a sectional view of a handle device of the mower in FIG. 1.

In this example, as shown in FIG. 7, a pressure sensor 19a may also be disposed on the handle device 10 of the mower 100 and is used for sensing the thrust applied by the user to the handle device 10 to drive the mower 100 to walk. The pressure sensor 19a is electrically connected to the wireless remote control device 15 and may output an electrical signal to the wireless remote control device 15 so that the wireless remote control device 15 outputs the control signal to the tool body 20 according to the electrical signal output by the pressure sensor 19a to change a walking speed of the mower 100.

In an example, the pressure sensor 19a is a resistance strain sensor. In other examples, the pressure sensor 19a may be a piezoelectric film sensor or a ceramic sensor. A triggering component 19b is also disposed on the handle device 10. When the thrust is applied to the grip 111, the triggering component 19b can apply a force to the pressure sensor 19a and drive the pressure sensor 19a to deform. Thus, when the user applies the thrust to the grip 111, the triggering component 19b applies the force to the pressure sensor 19a, and the pressure sensor 19a deforms and generates the electrical signal. Further, the pressure sensor 19a outputs the electrical signal to the wireless remote control device 15. Optionally, the wireless remote control device 15 may directly transmit, in the wireless communication manner, the electrical signal output by the pressure sensor 19a to the tool body 20, and the tool body 20 performs a calculation and then controls, according to the calculation, the drive motor 221 to change a rotational speed. Optionally, the wireless remote control device 15 may directly determine, according to the electrical signal output by the pressure sensor 19a, a control signal for controlling the rotational speed of the drive motor 221 and may transmit the control signal to the tool body 20 to control the motor to change the rotational speed. It is to be understood that when the user walks at an increasing speed, the thrust applied by the user to the handle device 10 increases and the wireless remote control device 15 controls a forward speed of the mower to increase. Similarly, when the user walks at a decreasing speed, the thrust applied by the user to the handle device 10 decreases and the wireless remote control device 15 controls the forward speed of the mower to decrease. Thus, the forward speed of the mower is adapted to a walking speed of the user, and the user will not be pulled by the mower to run, thereby improving the user's comfort.

Figure 10:
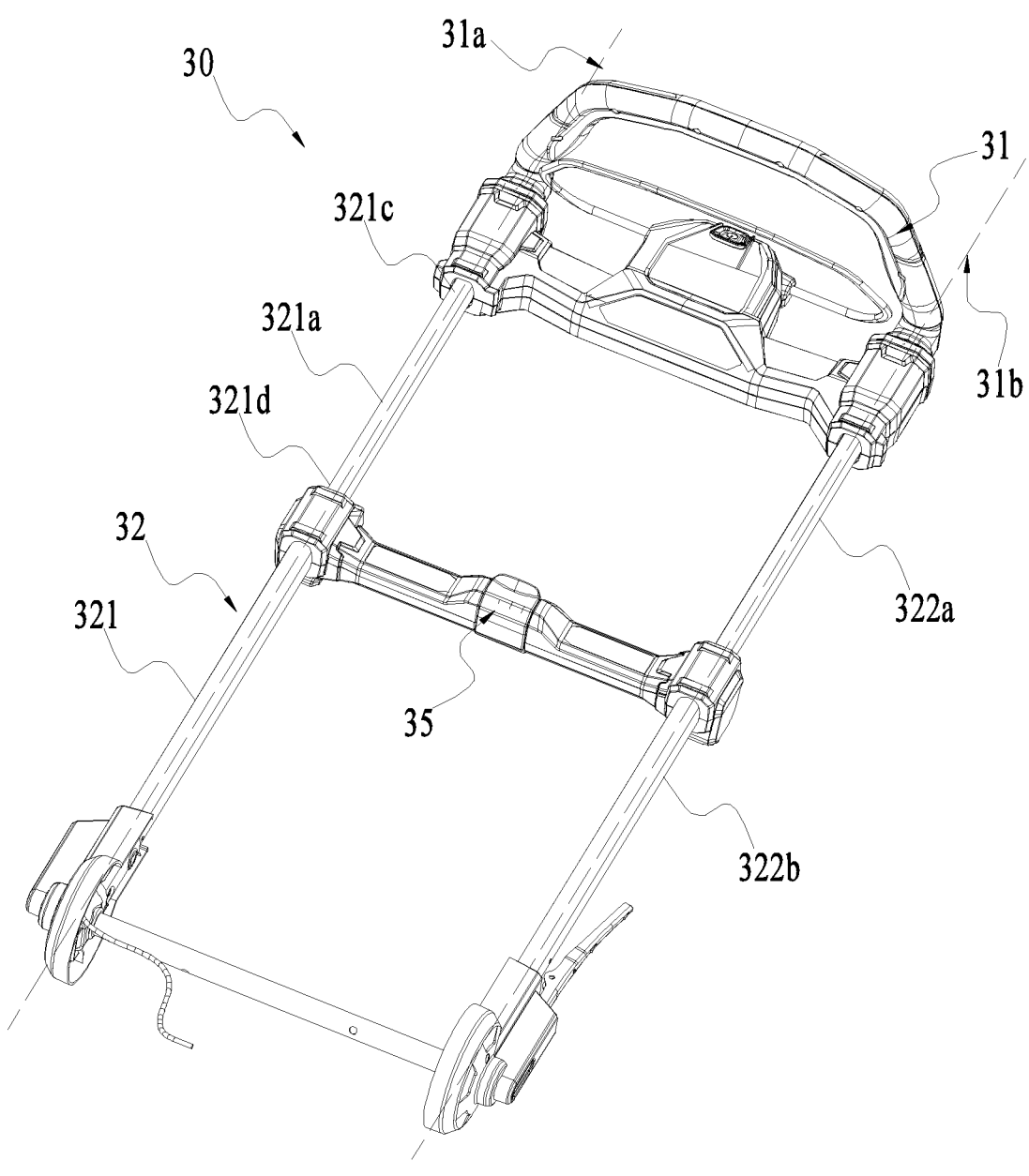
FIG. 10 is a perspective view of another handle device applicable to a tool body of the mower in FIG. 1.

FIG. 10 shows another handle device 30 adaptable to the tool body 20 in FIG. 1, where the handle device 30 is configured to be connectable to the tool body 20 in FIG. 1. The handle device 30 includes an operation member 31 and a connecting rod assembly 32, where the operation member 31 includes a grip 311 for the user to hold and the connecting rod assembly 32 is used for connecting the operation member 31 to the tool body 20.

As shown in FIGS. 10 to 14, the operation member 31 further includes a trigger 312 and a mounting housing 313, where the trigger 312 is rotatably connected to the mounting housing 313 and used for controlling the running of a control unit 22, and the mounting housing 313 is used for mounting the trigger 312 and connecting the operation member 31 to the connecting rod assembly 32.

The connecting rod assembly 32 includes a first connecting rod 321 connecting the operation member 31 to the tool body 20 and extending along a direction of a first straight line 31a. The first connecting rod 321 includes a first upper rod portion 321a and a first lower rod portion 321b, where a first end 321c of the first upper rod portion 321a is connected to the operation member 31, a second end 321d of the first upper rod portion 321a is connected to the first lower rod portion 321b, and the first lower rod portion 321b is further connected to the tool body 20. The first upper rod portion 321a is slidable relative to the first lower rod portion 321b along the first straight line 31a to a retracted position in FIG. 11 and an expanded position in FIG. 10. When the first upper rod portion 321a slides to the retracted position in FIG. 11, a dimension of the handle device 30 along the direction of the first straight line 31a becomes smaller, and in this case, the handle device 30 is in the retracted state. When the first upper rod portion 321a slides to the expanded position in FIG. 10, the dimension of the handle device 30 along the direction of the first straight line 31a becomes larger, and in this case, the handle device 30 is in the expanded state. In this example, the retracted position refers to a position to which the first upper rod portion 321a slides so that the handle device 30 has a minimum dimension along the direction of the first straight line 31a, and the expanded position refers to a position to which the first upper rod portion 321a slides so that the handle device 30 has a maximum dimension along the direction of the first straight line 31a. Of course, it is to be understood that in other examples, the handle device 30 may be in another state, that is, the intermediate state between the retracted state and the expanded state. When the handle device 30 is in the intermediate state, the dimension of the handle device 30 along the direction of the first straight line 31a is between the minimum dimension of the handle device 30 and the maximum dimension of the handle device 30.

In this example, the handle device 30 further includes a control device 33 electrically or communicatively connected to the control unit 22 in the tool body 20. The control unit 22 includes the cutting motor 222 and the drive motor 221. The control device 33 can control the running of the control unit 22, for example, the running of the cutting motor 222 or the running of the drive motor 221. In some examples, the control device 33 may control the cutting motor 222 to start or not, and the control device 33 may also control the drive motor 221 to start or not. In some examples, the control device 33 may control the rotational speed of the drive motor 221 or a rotational speed of the cutting motor 222. In some examples, the control device 33 may control a working mode of the drive motor 221 or a working mode of the cutting motor 222.

In this example, the control device 33 is mounted to the operation member 31 so that the trigger 312 and other electronic elements in the operation member 31 can be connected to the control device 33 and can transmit signals to the tool body 20 through the control device 33. The trigger 312 and the other electronic elements are connected to the control device 33 so that the control unit 22 or other electric devices in the tool body 20 are controlled through the control device 33 to work. For example, a safety switch 314 in the operation member 31 is electrically connected to the control device 33, and a speed regulation device in the operation member 31 is electrically connected to the control device 33.

The handle device 30 further includes a detection device 34 including a first detection element 341 for detecting a telescopic state of the handle device 30. The first detection element 341 can detect that the handle device 30 is in the retracted state or the expanded state, and the first detection element 341 is also electrically or communicatively connected to the control device 33. In this manner, the first detection element 341 can send detection information to the control device 33, and the control device 33 controls the control unit 22 according to the detection information from the first detection element 341. In this example, the first detection element 341 is electrically or communicatively connected to the control device 33 mounted in the handle device 30 so that information can be transmitted from the first detection element 341 to the control device 33 and the control unit 22 is controlled by the control device 33. Thus, on the one hand, electrical connection relationships in the mower can be reduced, which is conducive to reducing a cost and improving the reliability of information transmission; and on the other hand, the modular design of the handle device 30 is facilitated so that the handle device 30 is adaptable to more types of tool body 20. That is to say, the handle device 30 is also adaptable to a tool body 20 having other functions so that the hand-pushed power tool having the handle device 30 implements more functions. For example, the hand-pushed power tool may be a snow thrower, and the handle device 30 may be mounted to a body of the snow thrower to implement a snow removal function.

Figure 11:
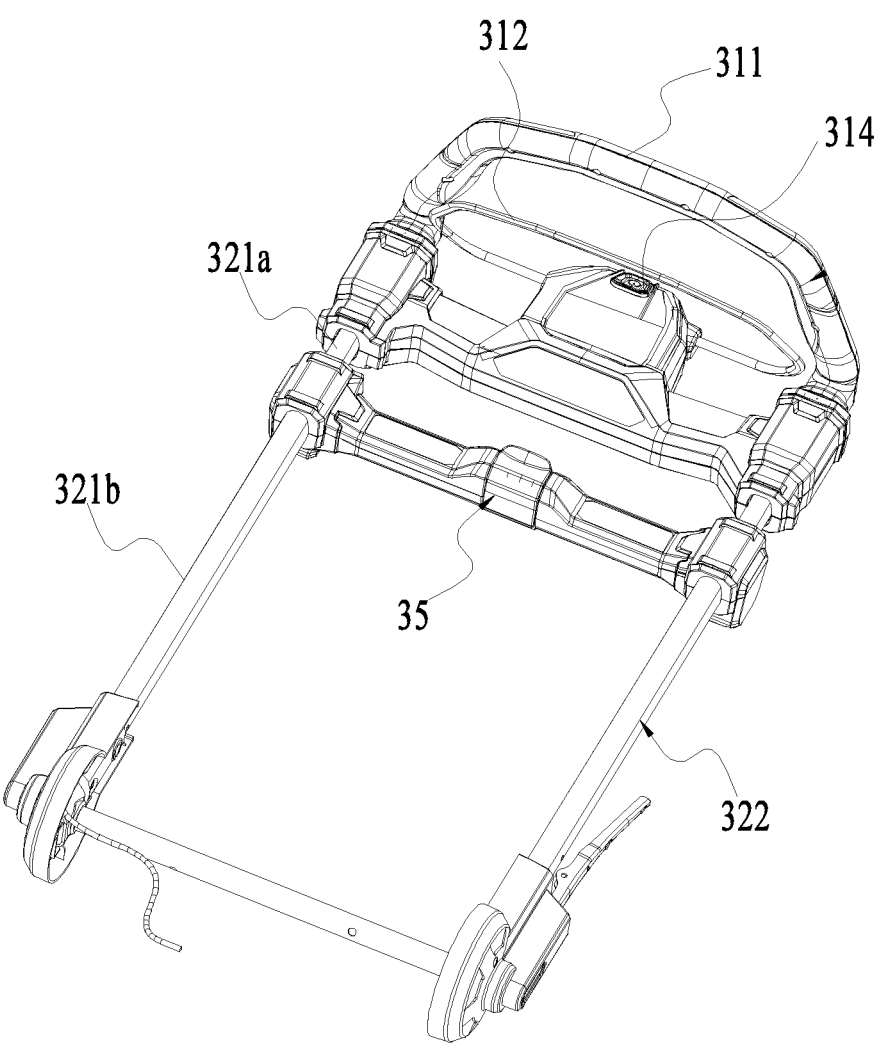
FIG. 11 is a perspective view of the handle device in FIG. 10, where the handle device is in a retracted state.
Figure 12:
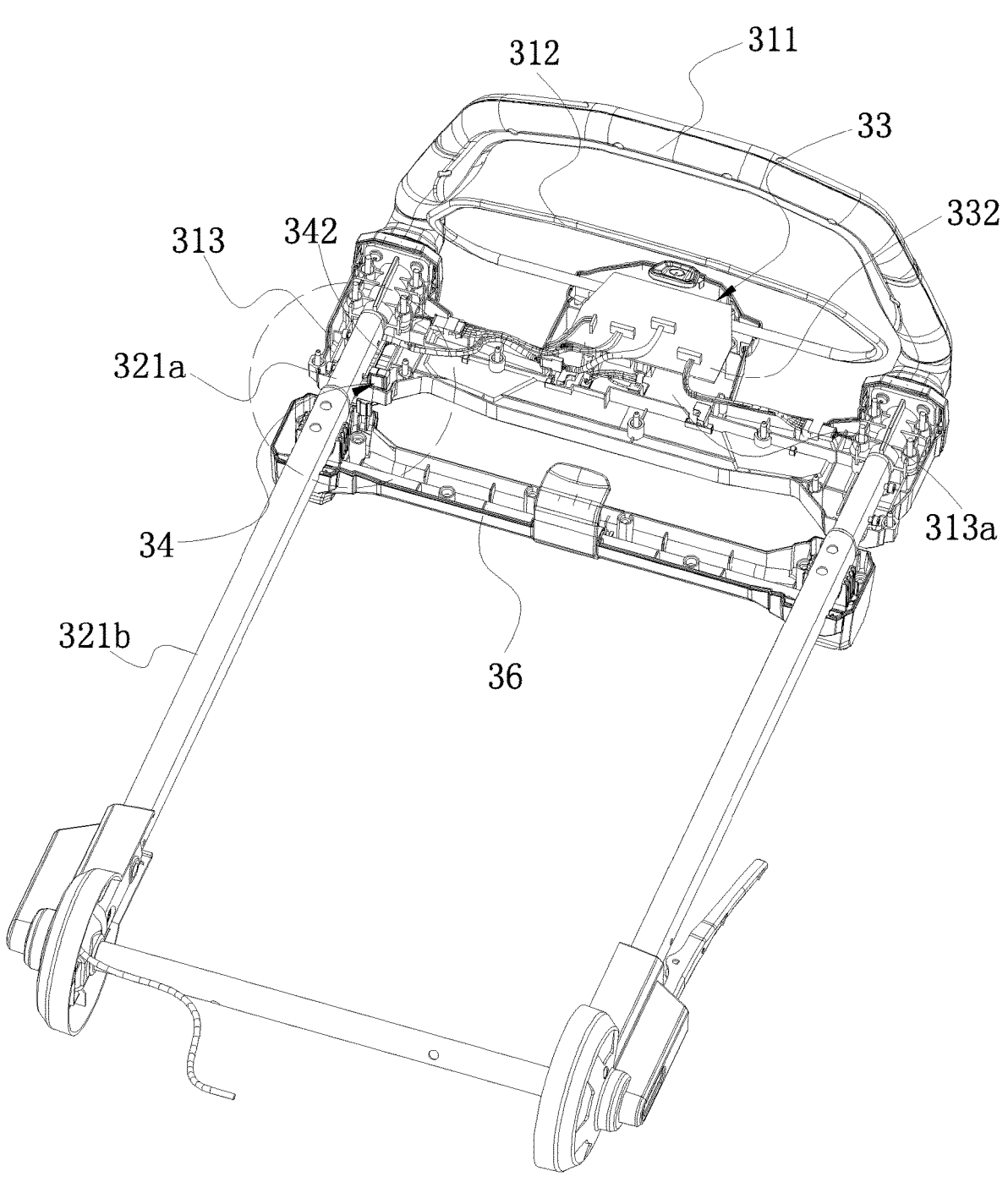
FIG. 12 is an interior view of the handle device in FIG. 11 with some parts removed.
Figure 13:
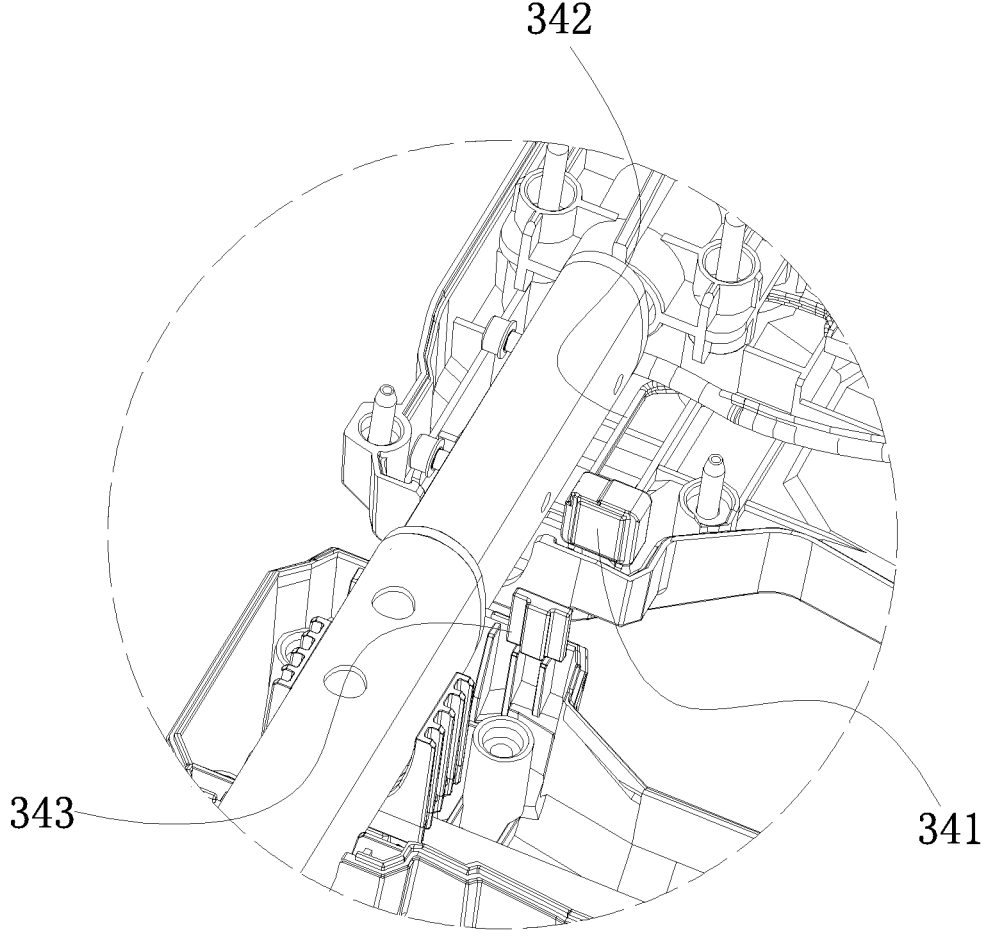
FIG. 13 is an enlarged view of a partial region in FIG. 12.
Figure 14:
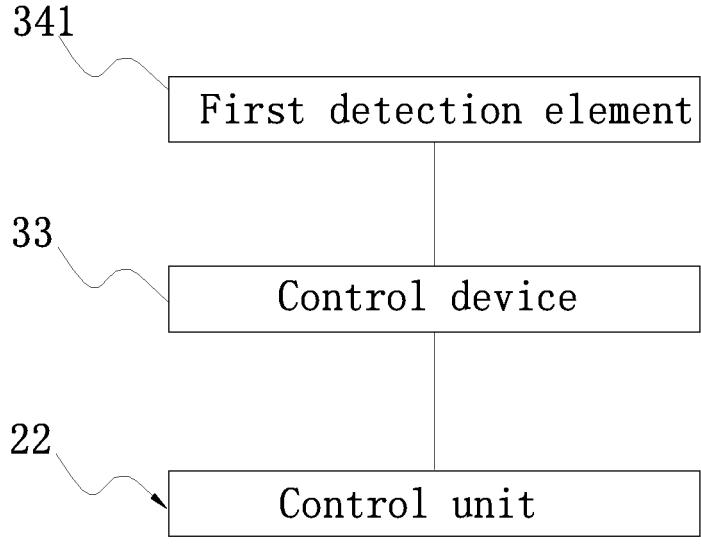
FIG. 14 is a control block diagram applicable to a mower.
Figure 15:
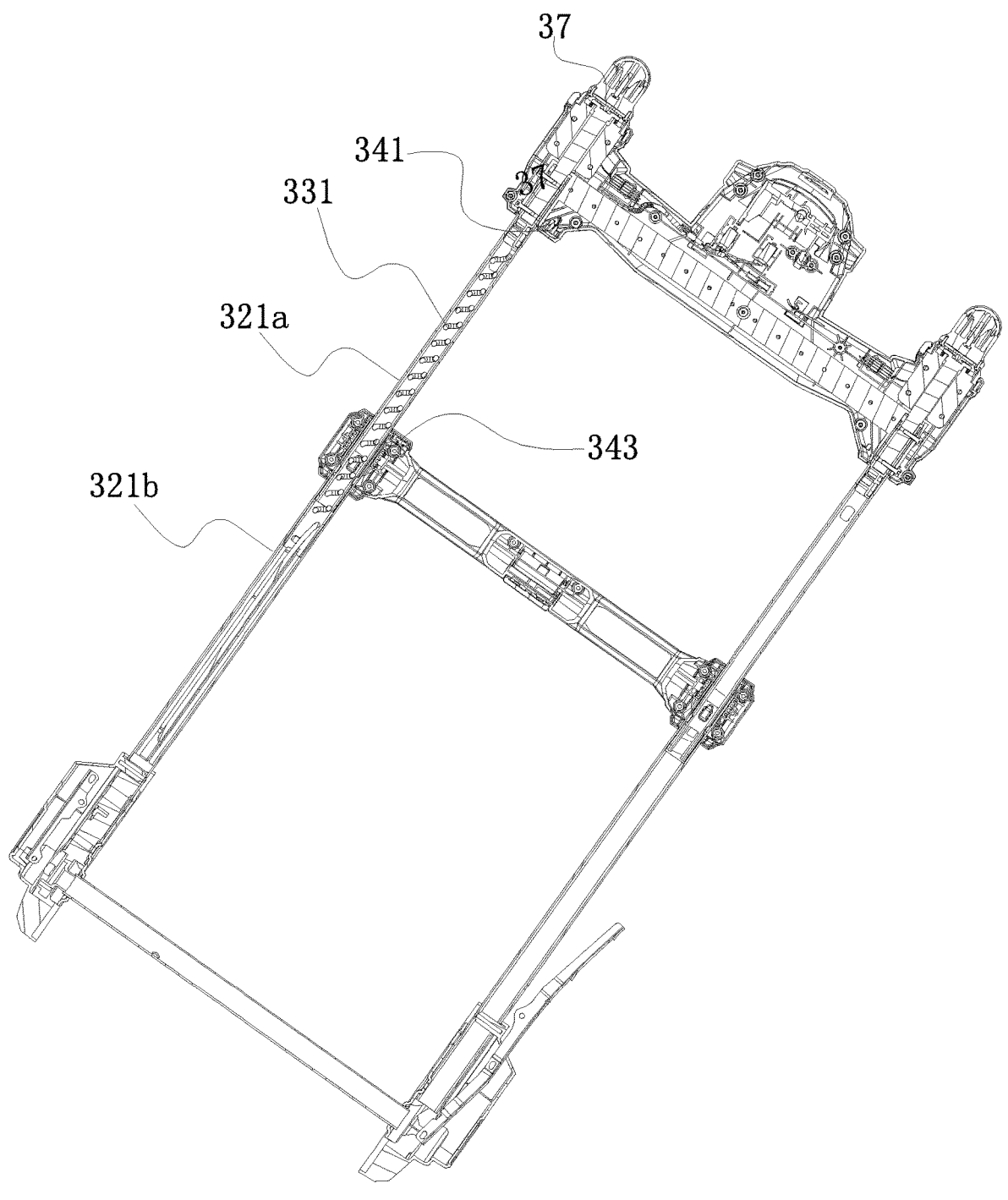
FIG. 15 is a sectional view of a handle device in FIG. 1.

The control device 33 is configured to control the running of the cutting motor 222 according to the detection information from the first detection element 341. When the first detection element 341 detects that the handle device 30 is in the retracted state, the control device 33 controls the cutting motor 222 to be incapable of being started. In this manner, the cutting motor 222 is not started even if the user operates the trigger 312 and/or the safety switch 314 by mistake, thereby ensuring the safety of the user. When the first detection element 341 detects that the handle device 30 is in the expanded state, the control device 33 allows the cutting motor 222 to be started. As shown in FIGS. 10 and 11, the handle device 30 further includes a locking device 35 for locking the slide of the first upper rod portion 321a relative to the first lower rod portion 321b. When the handle device 30 is out of the retracted position and the locking device 35 does not lock the first upper rod portion 321a, the user generally does not trigger the trigger 312 and the safety switch 314, and the cutting motor 222 is generally not started. It is to be understood that when the handle device 30 is in the intermediate state, the control device 33 may control, according to the detection information from the first detection element 341, the cutting motor 222 to be capable of being started or be incapable of being started. For example, the first detection element 341 detects a parameter value, and the parameter value may be compared with a preset parameter value. When the parameter value reaches the preset parameter value, the control device 33 controls the cutting motor 222 to be incapable of being started. In this manner, when the handle device 30 is in the retracted state or the intermediate state, the control device 33 may control the cutting motor 222 to be incapable of being started. In this example, when the parameter value is increased to the preset parameter value, the control device 33 controls the cutting motor 222 to be incapable of being started. In other examples, when the parameter value is reduced to the preset parameter value, the control device 33 controls the cutting motor 222 to be incapable of being started.

In some examples, the control device 33 is configured to control the running of the drive motor 221 according to the detection information from the first detection element 341. When the first detection element 341 detects that the handle device 30 is in the retracted state, the control device 33 controls the drive motor 221 to be incapable of being started. When the first detection element 341 detects that the handle device 30 is in the expanded state, the control device 33 controls the drive motor 221 to be capable of being started.

In some examples, the control device 33 is configured to control the running of the drive motor 221 and the running of the cutting motor 222 according to the detection information from the first detection element 341. When the first detection element 341 detects that the handle device 30 is in the retracted state, the control device 33 controls the drive motor 221 and the cutting motor 222 to be incapable of being started. When the first detection element 341 detects that the handle device 30 is in the expanded state, the control device 33 controls the drive motor 221 and the cutting motor 222 to be capable of being started.

As shown in FIGS. 11 to 15, the first detection element 341 is mounted to the operation member 31 or the first upper rod portion 321a. In this example, the first detection element 341 is mounted to the operation member 31. The first detection element 341 is electrically connected to the control device 33 through a first connecting wire 342. The first detection element 341 is mounted to the operation member 31, which can make the first connecting wire 342 connected to the control device 33 relatively short and the arrangement of the first connecting wire 342 relatively simple.

Specifically, the mounting housing 313 of the operation member 31 is formed with a first accommodation cavity 313a. The control device 33 is disposed in the first accommodation cavity 313a, the first detection element 341 is mounted to the mounting housing 313, and the first detection element 341 is at least partially disposed in the first accommodation cavity 313a so that the first connecting wire 342 is disposed in the first accommodation cavity 313a and a first connecting wire 342 can be configured to be the shortest. The reliability of the detection device 34 and the control device 33 is also improved. In this example, the first detection element 341 is disposed at an end of the mounting housing 313 close to the first connecting rod 321.

The first detection element 341 is a Hall sensor electrically connected to the control device 33 through the first connecting wire 342 and at least partially disposed in the first accommodation cavity 313a. The detection device 34 further includes a second detection element 343 cooperating with the first detection element 341, and the second detection element 343 is the magnetic member or the magnetically conductive element cooperating with the Hall sensor. The second detection element 343 is fixed relative to the first lower rod portion 321b. The second detection element 343 may be mounted to the first lower rod portion 321b or mounted in a housing fixedly connected to the first lower rod portion 321b.

Specifically, the handle device 30 further includes a connection housing 36 fixedly connected to the first lower rod portion 321b, and the second detection element 343 is mounted to the connection housing 36.

In this example, the connecting rod assembly 32 further includes a second connecting rod 322 connecting the operation member 31 to the tool body 20, and the second connecting rod 322 and the first connecting rod 321 are disposed at two opposite ends of the operation member 31. The second connecting rod 322 extends along a direction of a second straight line 31b parallel to the first straight line 31a. The second connecting rod 322 includes a second upper rod portion 322a and a second lower rod portion 322b, where the second upper rod portion 322a is connected to the operation member 31, and the second lower rod portion is connected to the tool body 20. The second upper rod portion 322a is slidable relative to the second lower rod portion 322b to a retracted position and an expanded position.

The handle device 30 further includes a second connecting wire 331 connecting the control device 33 to the control unit 22. In this example, one end of the second connecting wire 331 is disposed in the first accommodation cavity 313a and connected to the control device 33, and the other end of the second connecting wire 331 is disposed in the tool body 20 and connected to the control unit 22. The first connecting rod 321 is a hollow tube, and the second connecting wire 331 passes through the first connecting rod 321.

The control device 33 includes a circuit board 332, where the first connecting wire 342 and the second connecting wire 331 are both connected to the circuit board 332, and the circuit board 332 is accommodated in the first accommodation cavity 313a.

The second connecting rod 322 is also a hollow tube. In other examples, the second connecting wire 331 may pass through the second connecting rod 322.

The connection housing 36 connects the first connecting rod 321 to the second connecting rod 322, and the locking device 35 is mounted to the connection housing 36. The second detection element 343 is mounted to the connection housing 36. The second detection element 343 is the magnetic member at least partially disposed in the connection housing 36.

In this example, the handle device 30 may also include a pressure sensor 37 having the same structure as the pressure sensor 19a in FIG. 7, which is not described in detail.

Figure 16:
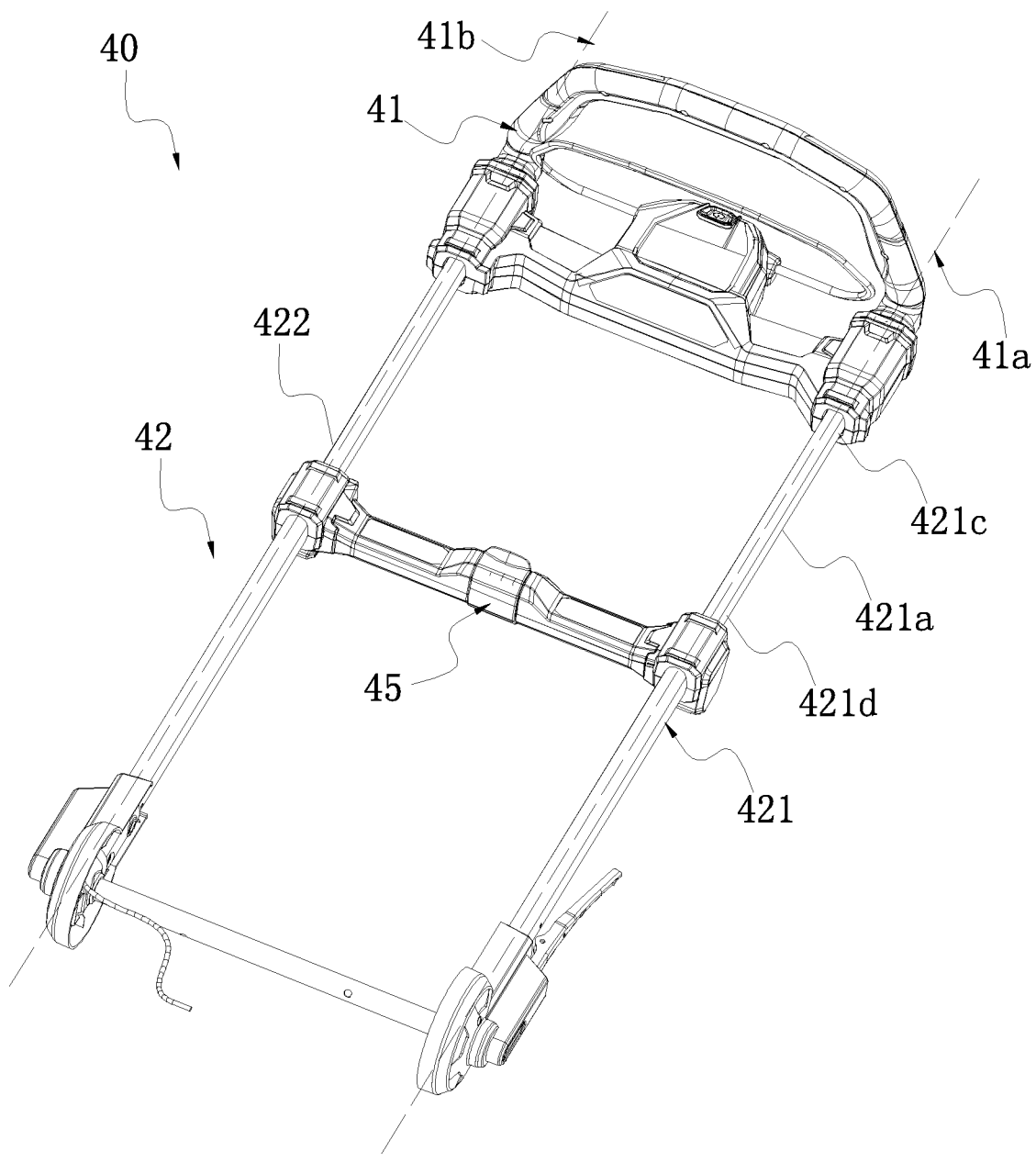
FIG. 16 is a perspective view of another handle device applicable to a tool body of the mower in FIG. 1.
Figure 17:
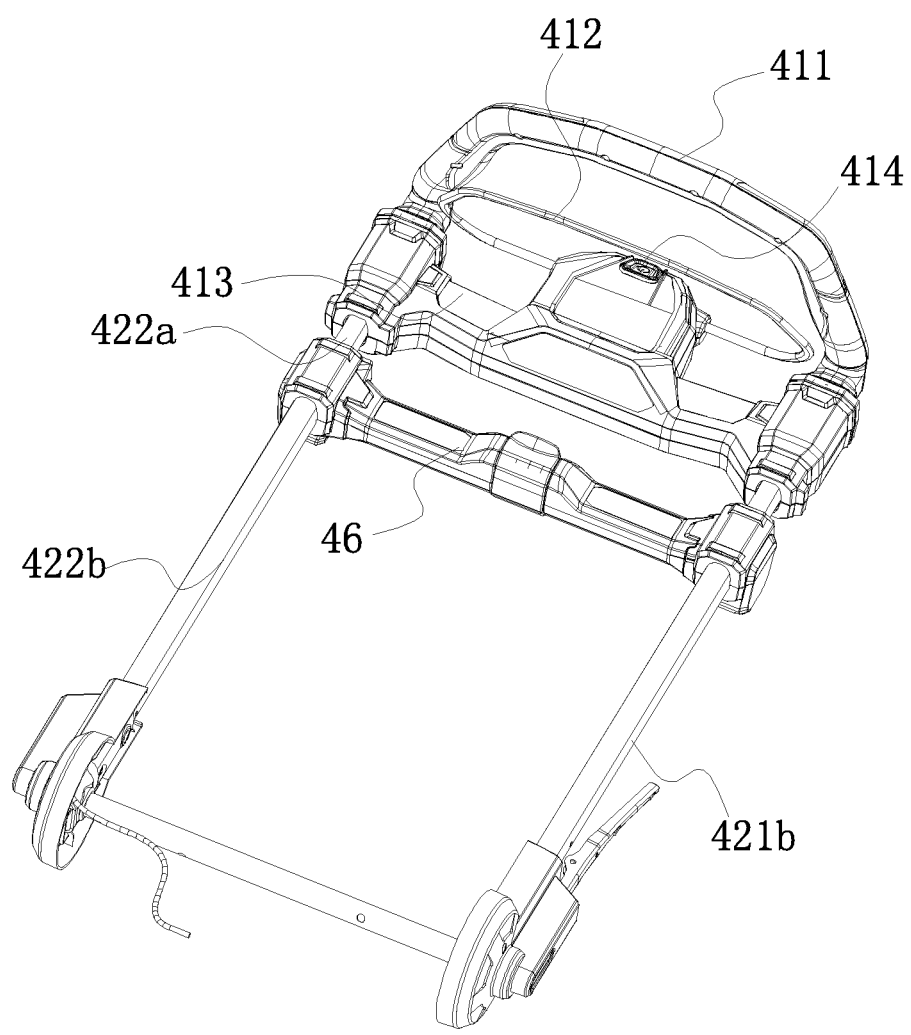
FIG. 17 is a perspective view of the handle device in FIG. 16, where the handle device is in a retracted state.
Figure 18:
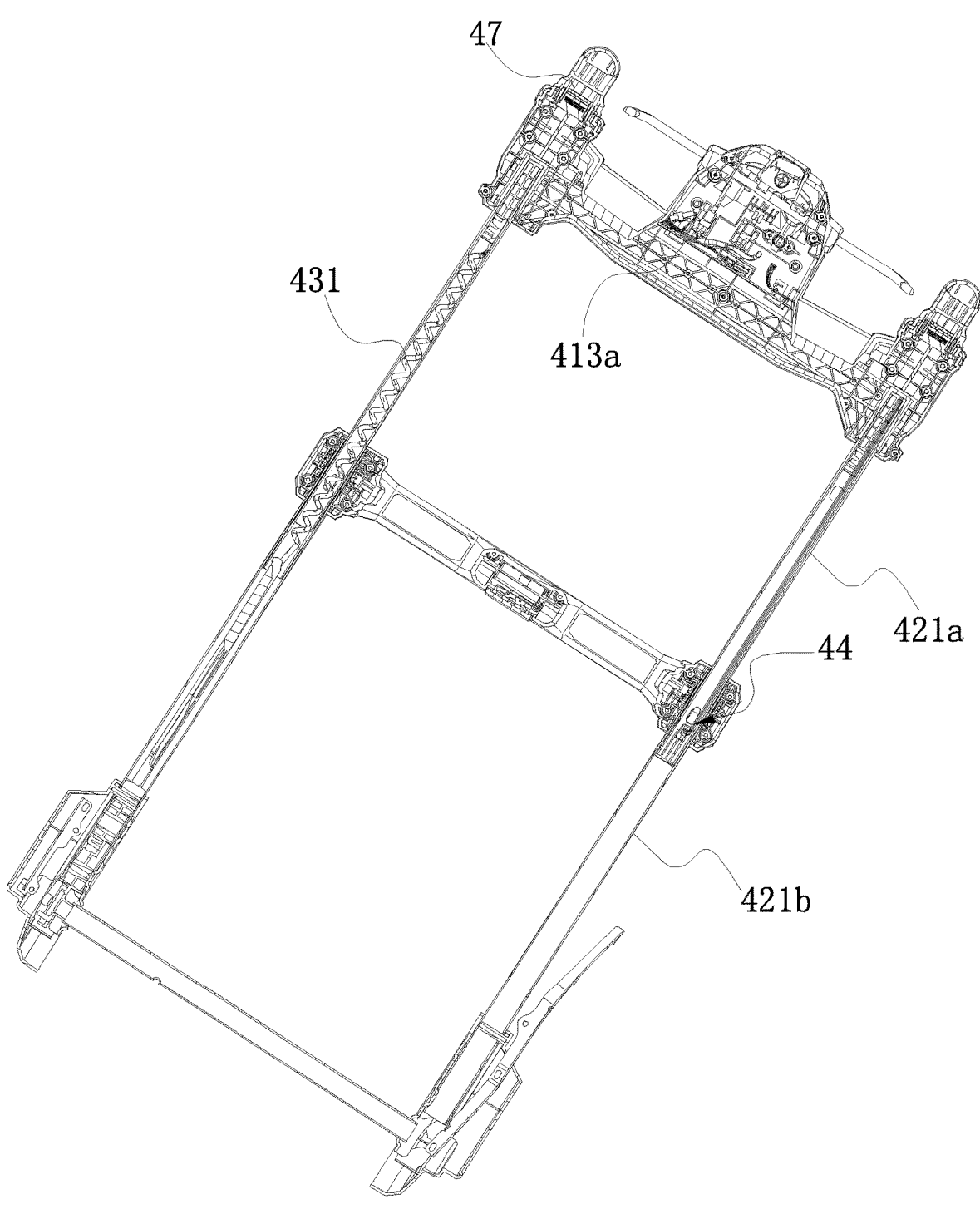
FIG. 18 is a sectional view of the handle device in FIG. 16.
Figure 19:
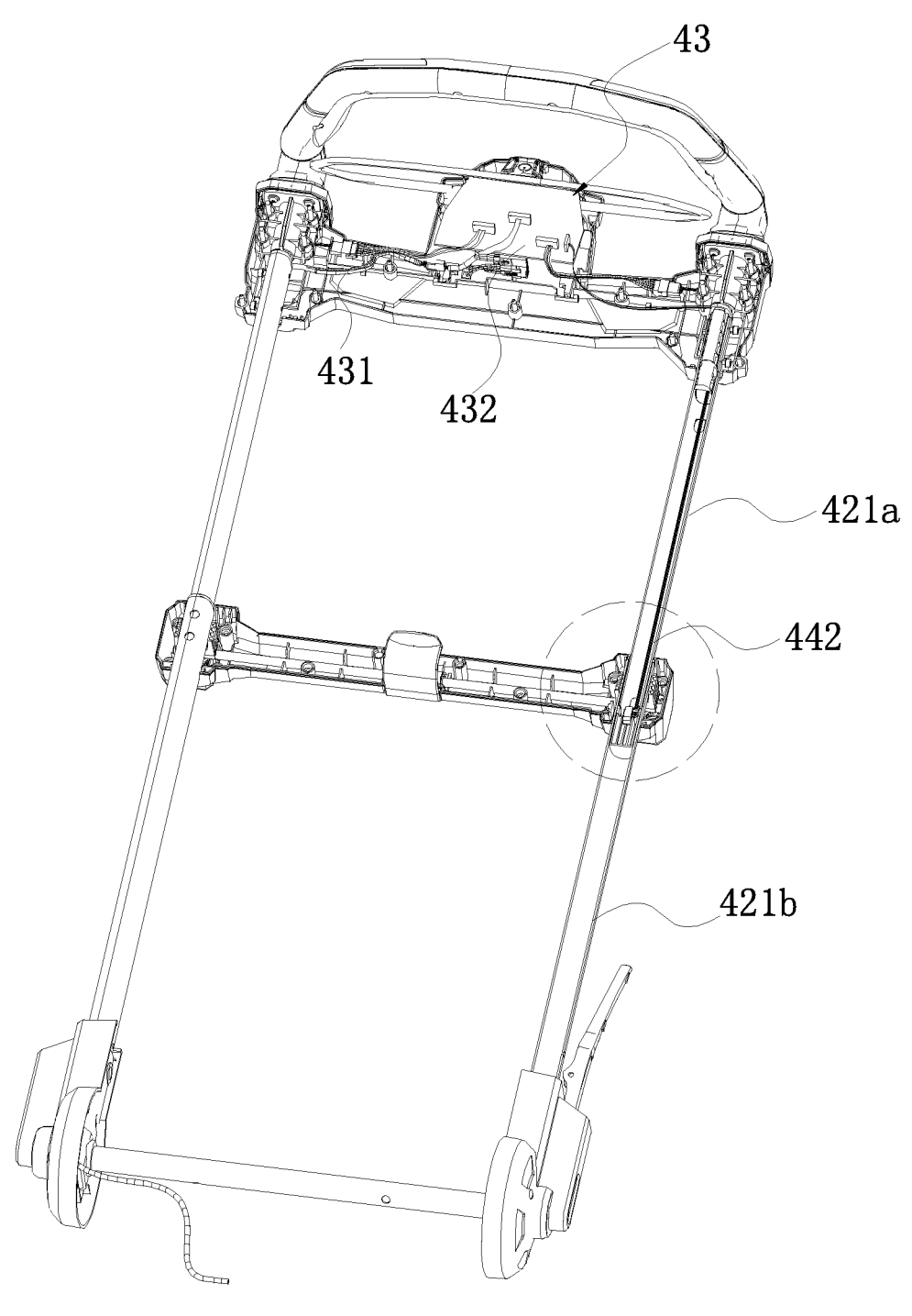
FIG. 19 is an interior view of the handle device in FIG. 16 with some parts removed and a first connecting rod being opened.
Figure 20:
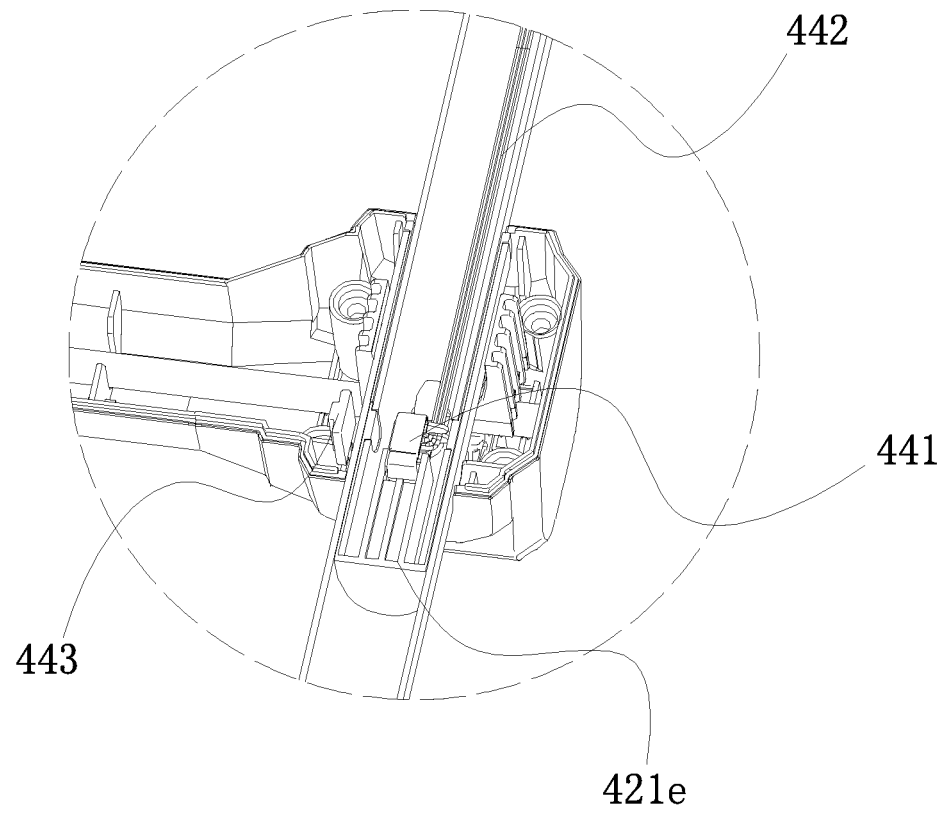
FIG. 20 is an enlarged view of a partial region in FIG. 19.
Figure 21:
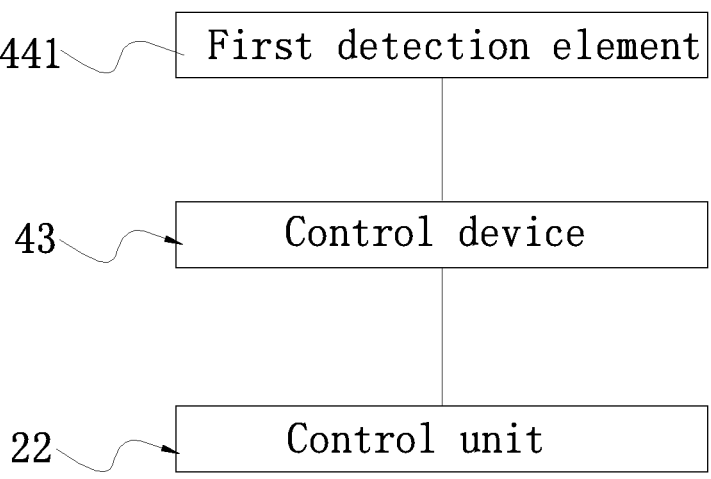
FIG. 21 is a control block diagram applicable to a mower.

FIG. 16 shows another handle device 40 adaptable to the tool body 20 in FIG. 1, where the handle device 40 is configured to be connectable to the tool body 20 in FIG. 1. The handle device 40 includes an operation member 41 and a connecting rod assembly 42. The operation member 41 includes a grip 411 for the user to hold. The connecting rod assembly 42 is used for connecting the operation member 41 to the tool body 20.

As shown in FIGS. 16 to 22, the operation member 41 further includes a trigger 412 and a mounting housing 413, where the trigger 412 is rotatably connected to the mounting housing 413 and used for controlling the running of the control unit 22, and the mounting housing 413 is used for mounting the trigger 412 and connecting the operation member 41 to the connecting rod assembly 42.

The connecting rod assembly 42 includes a first connecting rod 421 connecting the operation member 41 to the tool body 20 and extending along a direction of a first straight line 41a. The first connecting rod 421 includes a first upper rod portion 421a and a first lower rod portion 421b, where a first end 421c of the first upper rod portion 421a is connected to the operation member 41, a second end 421d of the first upper rod portion 421a is connected to the first lower rod portion 421b, and the first lower rod portion 421b is further connected to the tool body 20. The first upper rod portion 421a is slidable relative to the first lower rod portion 421b along the first straight line 41a to a retracted position shown in FIG. 17 and an expanded position shown in FIG. 16. When the first upper rod portion 421a slides to the retracted position, a dimension of the handle device 40 along the direction of the first straight line 41a becomes smaller, and in this case, the handle device 40 is in the retracted state. When the first upper rod portion 421a slides to the expanded position, the dimension of the handle device 40 along the direction of the first straight line 41a becomes larger, and in this case, the handle device 40 is in the expanded state. In this example, the retracted position refers to a position to which the first upper rod portion 421a slides so that the handle device 40 has a minimum dimension along the direction of the first straight line 41a, and the expanded position refers to a position to which the first upper rod portion 421a slides so that the handle device 40 has a maximum dimension along the direction of the first straight line 41a. Of course, it is to be understood that in other examples, the handle device 40 may be in another state, that is, the intermediate state between the retracted state and the expanded state. When the handle device 40 is in the intermediate state, the dimension of the handle device 40 along the direction of the first straight line 41a is between the minimum dimension of the handle device 40 and the maximum dimension of the handle device 40.

In this example, the handle device 40 further includes a control device 43 electrically or communicatively connected to the control unit 22 in the tool body 20. The control unit 22 includes the cutting motor 222 and the drive motor 221. The control device 43 can control the running of the control unit 22, for example, the running of the cutting motor 222 or the running of the drive motor 221. In some examples, the control device 43 may control the cutting motor 222 to start or not, or the control device 43 may control the drive motor 221 to start or not. In some examples, the control device 43 may control the rotational speed of the drive motor 221 or the rotational speed of the cutting motor 222. In some examples, the control device 43 may control the working mode of the drive motor 221 or the working mode of the cutting motor 222.

In this example, the control device 43 is mounted to the operation member 41 so that the trigger 412 and other electronic elements in the operation member 41 can be connected to the control device 43 and can transmit signals to the tool body 20 through the control device 43. The trigger 412 and the other electronic elements are connected to the control device 43 so that the control unit 22 or the other electric devices in the tool body 20 are controlled through the control device 43 to work. For example, a safety switch 414 in the operation member 41 is electrically connected to the control device 43, and a speed regulation device in the operation member 41 is electrically connected to the control device 43.

The handle device 40 further includes a detection device 44 including a first detection element 441 for detecting a telescopic state of the handle device 40. The first detection element 441 can detect that the handle device 40 is in the retracted state or the expanded state, and the first detection element 441 is also electrically or communicatively connected to the control device 43. In this manner, the first detection element 441 can send detection information to the control device 43, and the control device 43 controls the control unit 22 according to the detection information from the first detection element 441. In this example, the first detection element 441 is electrically or communicatively connected to the control device 43 mounted in the handle device 40 so that information can be transmitted from the first detection element 441 to the control device 43 and the control unit 22 is controlled by the control device 43. Thus, on the one hand, the electrical connection relationships in the mower can be reduced, which is conducive to reducing the cost and improving the reliability of information transmission; and on the other hand, the modular design of the handle device 40 is facilitated so that the handle device 40 is adaptable to more types of tool body 20. That is to say, the handle device 40 is also adaptable to the tool body 20 having the other functions so that the hand-pushed power tool having the handle device 40 implements more functions. For example, the hand-pushed power tool may be the snow thrower, and the handle device 40 may be mounted to the body of the snow thrower to implement the snow removal function.

The control device 43 is configured to control the running of the cutting motor 222 according to the detection information from the first detection element 441. When the first detection element 441 detects that the handle device 40 is in the retracted state, the control device 43 controls the cutting motor 222 to be incapable of being started. In this manner, the cutting motor 222 is not started even if the user operates the trigger 412 and/or the safety switch 414 by mistake, thereby ensuring the safety of the user. When the first detection element 441 detects that the handle device 40 is in the expanded state, the control device 43 allows the cutting motor 222 to be started. When the handle device 40 is in the intermediate state, the control device 43 controls the cutting motor 222 to be incapable of being started. Alternatively, in other examples, when the handle device 40 is in the intermediate state and locked in the intermediate state, the control device 43 controls the cutting motor 222 to be capable of being started. For example, the first detection element 441 detects a parameter value, and the parameter value may be compared with a preset parameter value. When the parameter value does not reach the preset parameter value, the control device 43 controls the cutting motor 222 to be incapable of being started. In this manner, when the handle device 40 is in the retracted state or the intermediate state, the control device 43 may control the cutting motor 222 to be incapable of being started. In this example, when the parameter value is increased to the preset parameter value, the control device 43 controls the cutting motor 222 to be capable of being started. In other examples, when the parameter value is reduced to the preset parameter value, the control device 43 controls the cutting motor 222 to be incapable of being started.

In some examples, the control device 43 is configured to control the running of the drive motor 221 according to the detection information from the first detection element 441. When the first detection element 441 detects that the handle device 40 is in the retracted state, the control device 43 controls the drive motor 221 to be incapable of being started.

When the first detection element 441 detects that the handle device 40 is in the expanded state, the control device 43 controls the drive motor 221 to be capable of being started.

In some examples, the control device 43 is configured to control the running of the drive motor 221 and the running of the cutting motor 222 according to the detection information from the first detection element 441. When the first detection element 441 detects that the handle device 40 is in the retracted state, the control device 43 controls the drive motor 221 and the cutting motor 222 to be incapable of being started. When the first detection element 441 detects that the handle device 40 is in the expanded state, the control device 43 controls the drive motor 221 and the cutting motor 222 to be capable of being started.

In this example, the first detection element 441 is mounted to the first upper rod portion 421a. The first detection element 441 is electrically connected to the control device 43 through a first connecting wire 442. The first detection element 441 is mounted to the first upper rod portion 421a, which can make the length of the first connecting wire 442 connected to the control device 43 shorter and the arrangement of the first connecting wire 442 relatively simple.

Specifically, the mounting housing 413 of the operation member 41 is formed with a first accommodation cavity 413a in which the control device 43 is disposed. The first connecting rod 421 is a tube, and the first detection element 441 is mounted to the second end 421d of the first upper rod portion 421a close to the first lower rod portion 421b. A mounting member 421d is disposed at the second end 421d, and the first detection member 441 is mounted to the mounting member 421d. The first detection element 441 may be at least partially disposed in the first upper rod portion 421a. The first connecting wire 442 passes through the first upper rod portion 421a to connect the first detection element 441 to the control device 43.

In this example, the handle device 40 further includes a second connecting rod 422 connecting the operation member 41 to the tool body 20, and the second connecting rod 422 and the first connecting rod 421 are disposed at two opposite ends of the operation member 41. The second connecting rod 422 extends along a direction of a second straight line 41b parallel to the first straight line 41a. The second connecting rod 422 includes a second upper rod portion 422a and a second lower rod portion 422b, where the second upper rod portion 422a is connected to the operation member 41, and the second lower rod portion 422b is connected to the tool body 20. The second upper rod portion 422a is slidable relative to the second lower rod portion 422b to a retracted position and an expanded position.

The handle device 40 further includes a second connecting wire 431 connecting the control device 43 to the control unit 22. In this example, one end of the second connecting wire 431 is disposed in the first accommodation cavity 413a and connected to the control device 43, and the other end of the second connecting wire 431 is disposed in the tool body 20 and connected to the control unit 22. The second connecting rod 422 is a hollow tube, and the second connecting wire 431 passes through the second connecting rod 422. Thus, the first connecting wire 442 is disposed in the first connecting rod 421, and the second connecting wire 431 is disposed in the second connecting rod 422 so that the first connecting wire 442 and the second connecting wire 431 can be better arranged.

The control device 43 includes a circuit board 432, where the first connecting wire 442 and the second connecting wire 431 are both connected to the circuit board 432, and the circuit board 432 is accommodated in the first accommodation cavity 413a.

Of course, it is to be understood that in other examples, the second connecting wire 431 may pass through the first connecting rod 421.

In this example, the first detection element 441 is the switch element, specifically, the Hall sensor. The Hall sensor is electrically connected to the control device 43 through the first connecting wire 442 and at least partially disposed in the first connecting rod 421. The detection device 44 further includes a second detection element 443 cooperating with the first detection element 441, and the second detection element 443 is a triggering member cooperation with the switch element. Specifically, the second detection element 443 is the magnetic member or the magnetically conductive element cooperating with the Hall sensor. The second detection element 443 is fixed relative to the first lower rod portion 421b. The second detection element 443 may be mounted to the first lower rod portion 421b or mounted in a housing fixedly connected to the first lower rod portion 421b. In this example, the handle device 40 further includes a connection housing 46 fixedly connected to the first lower rod portion 421b, and the second detection element 443 is mounted to the connection housing 46. The connection housing 46 connects the first connecting rod 421 to the second connecting rod 422, the handle device 40 includes a locking device 45 for locking the first connecting rod 421, and the locking device 45 is mounted to the connection housing 46. The second detection element 443 is mounted to the connection housing 46. The second detection element 443 is the magnetic member at least partially disposed in the connection housing 46.

Figure 22:
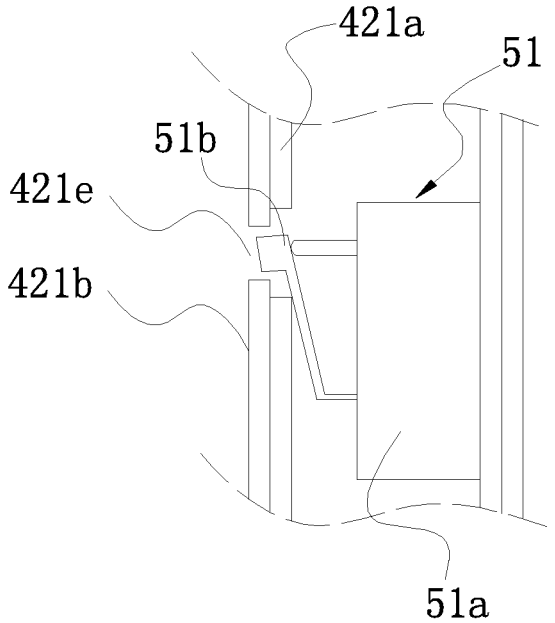
FIG. 22 is a schematic view of a detection device applicable to the handle device in FIG. 16.
Figure 23:
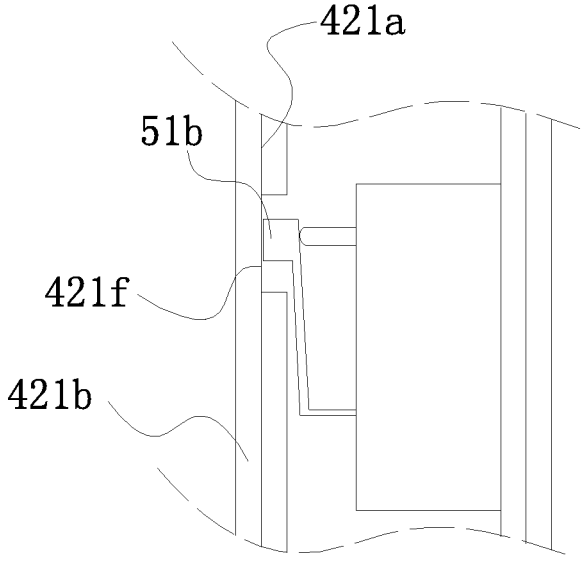
FIG. 23 is a schematic view of the detection device in FIG. 22 when a handle device is in a retracted state.

It is to be understood that in other examples, the first detection element 441 may be another switch element. As shown in FIGS. 22 and 23, the switch element is a contact switch 51 including a switch 51a disposed in the first upper rod portion 421a and a triggered member 51b connected to the switch 51a. The second detection element 443 is the triggering member mounted to the first lower rod portion 421b or the connection housing 46. Specifically, the triggering member may be an inner wall 421f of the first lower rod portion 421b. The first lower rod portion 421b is further formed with a hole 421e. When the handle device 40 is in the expanded state, as shown in FIG. 22, the first upper rod portion 421a slides to a position where the triggered member 51b corresponds to the hole 421e, the hole 421e releases the triggered member 51b, the contact switch 51 is in the off state, the detection device 44 detects that the handle device 40 is in the expanded state, and the control device 43 allows the cutting motor 222 to be started. When the handle device 40 is in the retracted state, as shown in FIG. 23, the first upper rod portion 421a slides to a position where the triggered member 51b does not correspond to the hole 421e, the inner wall 421f of the first lower rod portion 421b does not release the triggered member 51b, the contact switch 51 is in the on state, the detection device 44 detects that the handle device 40 is in the retracted state, and the control device 43 prevents the cutting motor 222 from being started. Similarly, when the handle device 40 is in the intermediate state, the triggered member 51b does not correspond to the hole 421e, the contact switch 51 is in the on state, and the control device 43 prevents the cutting motor 222 from being started.

In this example, the handle device 40 may also include a pressure sensor 47 having the same structure as the pressure sensor 19a in FIG. 7, which is not described in detail.

It is to be noted that "first" and "second" in the present application are only used for distinguishing one from another, and naming conventions of "first" and "second" are interchangeable

What is claimed is:

1. A hand-pushed power tool, comprising:
a tool body comprising a working assembly and a control unit for controlling running of the working assembly; and
a handle device connected to the tool body;
wherein the handle device comprises:
an operation member comprising a grip for a user to hold;
a connecting rod assembly comprising a first connecting rod connected to the tool body, wherein the first connecting rod comprises a first lower rod portion and a first upper rod portion, the first lower rod portion is connected to the tool body, the first upper rod portion is connected to the operation member and slidable relative to the first lower rod portion along a first straight line to a retracted position and an expanded position, the handle device is in a retracted state when the first upper rod portion is in the retracted position, and the handle device is in an expanded state when the first upper rod portion is in the expanded position;
a detection device comprising a first detection element for detecting a telescopic state of the handle device; and
a control device mounted to the operation member and electrically or communicatively connected to the first detection element;
wherein the control device is configured to control the control unit according to detection information from the first detection element, the first detection element is electrically connected to the control device through a first connecting wire, the handle device further comprises a second connecting wire connecting the control device to the control unit, the first connecting rod is connected to an end of the operation member, the handle device further comprises a second connecting rod connected to another end of the operation member, and the second connecting wire passes through the second connecting rod.

2. The hand-pushed power tool according to claim 1, wherein the first detection element is a Hall sensor.

3. The hand-pushed power tool according to claim 2, wherein the detection device further comprises a second detection element which is a magnetic member or a magnetically conductive element cooperating with the Hall sensor, and the second detection element is mounted to the first lower rod portion or mounted in a housing fixedly connected to the first lower rod portion.

4. The hand-pushed power tool according to claim 1, wherein the control device is disposed in a mounting housing.

5. The hand-pushed power tool according to claim 1, wherein the operation member comprises a mounting housing connected to the grip or the first connecting rod, and the first detection element is at least partially disposed in the mounting housing.

6. The hand-pushed power tool according to claim 5, wherein the first detection element is disposed at an end of the mounting housing close to the first connecting rod.

7. The hand-pushed power tool according to claim 6, wherein the handle device further comprises a connection housing connecting the first connecting rod to the second connecting rod, the detection device further comprises a second detection element, the first detection element is a Hall sensor, the second detection element is a magnetic member or a magnetically conductive element cooperating with the Hall sensor, and the second detection element is at least partially disposed in the connection housing.

8. The hand-pushed power tool according to claim 1, wherein the first detection element is mounted to an end portion of the first upper rod portion close to the first lower rod portion.

9. The hand-pushed power tool according to claim 8, wherein the first detection element is at least partially disposed in the first upper rod portion.

10. The hand-pushed power tool according to claim 9, wherein the first connecting wire passes through the first upper rod portion to be connected to the control device.

11. The hand-pushed power tool according to claim 10, wherein the first detection element is a switch element, and the detection device further comprises a triggering member cooperating with the switch element.

12. The hand-pushed power tool according to claim 11, wherein the first detection element is a Hall sensor, and the triggering member is a magnetic member or a magnetically conductive element cooperating with the Hall sensor.

13. The hand-pushed power tool according to claim 10, wherein the first detection element is a contact switch.

14. The hand-pushed power tool according to claim 1, wherein the control device is configured to, when the detection information from the first detection element increases or decreases to a preset parameter value, control the control unit to be incapable of running.

15. A handle device, comprising:
an operation member comprising a grip for a user to hold;
a connecting rod assembly comprising a first connecting rod connected to a tool body, wherein the first connecting rod comprises a first lower rod portion and a first upper rod portion, the first lower rod portion is connected to the tool body, the first upper rod portion is connected to the operation member and slidable relative to the first lower rod portion along a first straight line to a retracted position and an expanded position, the handle device is in a retracted state when the first upper rod portion is in the retracted position, and the handle device is in an expanded state when the first upper rod portion is in the expanded position;
a detection device comprising a first detection element for detecting a telescopic state of the handle device; and
a control device mounted to the operation member and electrically or communicatively connected to the first detection element;
wherein the control device is configured to control a working assembly of the tool body to work according to detection information from the first detection element, the first connecting rod is connected to an end of the operation member, the handle device further comprises a second connecting rod connected to another end of the operation member and a second detection element cooperating with the first detection element, the first detection element is a Hall sensor, the second detection element is a magnetic member or a magnetically conductive element cooperating with the Hall sensor, the Hall sensor is disposed inside the first upper rod portion and connected to the control device through a first connecting wire, and the second detection element is mounted to the first lower rod portion or mounted in a housing fixedly connected to the first lower rod portion.

16. A mower, comprising:

a tool body comprising a cutting assembly and a cutting
motor for controlling the cutting assembly to perform a
cutting function; and a handle device connected to the tool body; wherein the handle device comprises:

an operation member comprising a grip for a user to hold;

a connecting rod assembly comprising a first connecting
rod connected to the tool body, wherein the first con-
necting rod comprises a first lower rod portion and a
first upper rod portion, the first lower rod portion is
connected to the tool body, the first upper rod portion
is connected to the operation member and slidable
relative to the first lower rod portion along a first
straight line to a retracted position and an expanded
position, the handle device is in a retracted state when
the first upper rod portion is in the retracted position,
and the handle device is in an expanded state when the
first upper rod portion is in the expanded position;

a detection device comprising a first detection element for detecting a telescopic state of the handle device; and a control device mounted to the operation member and
electrically or communicatively connected to the first
detection element;

wherein the control device is configured to control the
cutting motor according to detection information from
the first detection element, the first detection element is
a Hall sensor, the Hall sensor is disposed inside the first
connecting rod and connected to the control device
through a first connecting wire, a plug is provided at a
lower-end hole of the first upper rod portion, and the
Hall sensor is mounted to this plug.

\* \* \* \* \*